(12) United States Patent
Choi et al.

(10) Patent No.: US 12,075,405 B2
(45) Date of Patent: Aug. 27, 2024

(54) METHOD FOR TRANSMITTING UPLINK SHARED CHANNEL IN WIRELESS COMMUNICATION SYSTEM AND DEVICE USING SAME

(71) Applicant: WILUS INSTITUTE OF STANDARDS AND TECHNOLOGY INC., Gyeonggi-do (KR)

(72) Inventors: Kyungjun Choi, Gyeonggi-do (KR); Minseok Noh, Seoul (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 445 days.

(21) Appl. No.: 17/420,667

(22) PCT Filed: Jan. 10, 2020

(86) PCT No.: PCT/KR2020/000547
§ 371 (c)(1),
(2) Date: Jul. 3, 2021

(87) PCT Pub. No.: WO2020/145769
PCT Pub. Date: Jul. 16, 2020

(65) Prior Publication Data
US 2022/0104224 A1    Mar. 31, 2022

(30) Foreign Application Priority Data

Jan. 10, 2019   (KR) ......................... 10-2019-0003578
Feb. 14, 2019   (KR) ......................... 10-2019-0017303
(Continued)

(51) Int. Cl.
*H04W 4/00*        (2018.01)
*H04L 1/1812*      (2023.01)
(Continued)

(52) U.S. Cl.
CPC ....... *H04W 72/1268* (2013.01); *H04L 1/1812* (2013.01); *H04W 72/23* (2023.01)

(58) Field of Classification Search
CPC .. H04W 72/12; H04W 72/1268; H04L 1/1812
See application file for complete search history.

(56) References Cited

U.S. PATENT DOCUMENTS 8,948,111 B2     2/2015   Chen et al.
10,841,914 B2 *  11/2020  Liou ...................... H04L 5/0094
(Continued)

FOREIGN PATENT DOCUMENTS

CN    103026773    4/2013
CN    104137573    11/2014
(Continued)

OTHER PUBLICATIONS

Office Action dated Aug. 28, 2023 for Japanese Patent Application No. 2021-540198 and its English translation provided by the Applicant's foreign counsel.
(Continued)

*Primary Examiner* — Elisabeth Benoit Magloire
(74) *Attorney, Agent, or Firm* — Womble Bond Dickinson (US) LLP

(57) ABSTRACT

Provided is a method for transmitting, by a terminal, a physical uplink shared channel (PUSCH) to a base station in a wireless communication system. The method comprises: a step for receiving, from a base station, an radio resource control (RRC) signal including configuration information on a semi-static uplink symbol, a flexible symbol, and a downlink symbol; a step for receiving a physical downlink control channel (PDCCH) for scheduling a PUSCH transmission including at least one PUSCH repetition; a step for determining whether at least one of the required number of symbols for transmitting the PUSCH repetition cannot trans-
(Continued)

mit the PUSCH repetition; and a step for transmitting the PUSCH repetition to the base station on the basis of the determination on whether the PUSCH repetition cannot be transmitted. When the PUSCH repetition cannot be transmitted, at least one of the symbols is a symbol designated as a semi-static downlink symbol by the configuration information.

15 Claims, 21 Drawing Sheets

(30) Foreign Application Priority Data

Feb. 14, 2019 (KR) .................. 10-2019-0017490
Apr. 1, 2019 (KR) .................. 10-2019-0037696

(51) Int. Cl.
  *H04W 72/1268* (2023.01)
  *H04W 72/23* (2023.01)

(56) References Cited

U.S. PATENT DOCUMENTS

| | | | |
|---|---|---|---|
| 2017/0019930 A1 | 1/2017 | Lee et al. | |
| 2017/0134140 A1 | 5/2017 | Park | |
| 2018/0279297 A1* | 9/2018 | Nogami | H04L 1/1887 |
| 2018/0279327 A1 | 9/2018 | Ying et al. | |
| 2018/0323909 A1* | 11/2018 | Ying | H04L 1/1822 |
| 2018/0376498 A1* | 12/2018 | Bhattad | H04L 1/1825 |
| 2020/0221478 A1 | 7/2020 | Fakoorian et al. | |
| 2020/0267756 A1 | 8/2020 | Fakoorian et al. | |
| 2020/0274639 A1 | 8/2020 | Yang et al. | |
| 2020/0313793 A1 | 10/2020 | Jung et al. | |
| 2021/0091890 A1 | 3/2021 | Ren et al. | |
| 2021/0153207 A1 | 5/2021 | Bhamri et al. | |
| 2021/0306101 A1* | 9/2021 | Okamura | H04L 1/0643 |

FOREIGN PATENT DOCUMENTS

| | | |
|---|---|---|
| CN | 104780549 | 7/2015 |
| CN | 105453677 | 3/2016 |
| CN | 105493557 | 4/2016 |
| CN | 110536458 | 12/2019 |
| EP | 3 684 123 | 7/2020 |
| EP | 3697013 A1 | 8/2020 |
| EP | 3 996 315 | 5/2022 |
| JP | 2021-532632 | 11/2021 |
| KR | 10-1832759 | 2/2018 |
| KR | 10-1851240 | 4/2018 |
| WO | 2012/167489 | 12/2012 |
| WO | 2013/052504 | 4/2013 |
| WO | 2016/163805 | 10/2016 |
| WO | 2020/030174 | 2/2020 |
| WO | 2020030013 A1 | 2/2020 |
| WO | 2020033785 A1 | 2/2020 |
| WO | 2020069359 A1 | 4/2020 |
| WO | 2020165835 A1 | 8/2020 |
| WO | 2020167238 A1 | 8/2020 |
| WO | 2020167650 A1 | 8/2020 |
| WO | 2020172613 A1 | 8/2020 |

OTHER PUBLICATIONS

ZTE.: "Enhancement for UL grant-free transmissions", 3GPP TSG RAN WG1 Meeting #94bis, R1-1810347, Chengdu, China, Oct. 8-12, 2018, pp. 1-6.
NTT DOCOMO, Inc.: "Offline summary for AI 7.1.3.3.4 UL data transmission procedure", 3GPP TSG RAN WG1 Meeting #92, R1-1803295, Athens, Greece, Feb. 26-Mar. 2, 2018, pp. 1-22.
LG Electronics: "Remaining issues on UL data transmission procedure", 3GPP TSG RAN WG1 Meeting #92, R1-1802215, Athens, Greece, Feb. 26-Mar. 2, 2018, pp. 1-13.
Extended European Search Report dated Sep. 14, 2022 for European Patent Application No. 20738748.1.
NTT DOCOMO, Inc.: "UL data transmission procedure", 3GPP TSG RAN WG1 Meeting #92, R1-1802488, Athens, Greece, Feb. 26-Mar. 2, 2018, pp. 1-12.
International Preliminary Report on Patentability (Chapter I) issued on Jun. 16, 2021 for PCT/KR2020/000547 and its English translation from WIPO (now published as WO 2020/145769).
Office Action dated Jun. 30, 2023 for European Patent Application No. 20 738 748.1.
First Office Action for Indian Patent Application 202127032805 issued on Apr. 21, 2022 by the Indian Patent Office.
International Search Report for PCT/KR2020/000547 mailed on Apr. 23, 2020 and its English translation from WIPO (now published as WO 2020/145769).
Written Opinion of the International Searching Authority for PCT/KR2020/000547 mailed on Apr. 23, 2020 and its English translation by Google Translate (now published as WO 2020/145769).
Office Action dated Oct. 19, 2023 for Chinese Patent Application No. 202080008892.3 and its English translation provided by the Applicant's foreign counsel.
He Chenglong et al.: "Research on PUSCH channel in LTE—A system", (Digital Technology and Application), 08, DOI: 10.19695/j.cnki.cn12-1369, Aug. 15, 2013, pp. 1-3.
LG Electronics: "Discussion on PUSCH transmissions for MTC", 3GPP TSG RAN WG1 Meeting #80bis, R1-151490, Belgrade, Serbia, Apr. 11, 2015, pp. 1-5.
Office Action dated Apr. 22, 2024 for Korean Patent Application No. 10-2021-7021469 and its English translation provided by Applicant's foreign counsel.
NTT Docomo, Inc: "Enhanced UL transmission with configured grant for URLLC", 3GPP TSG RAN WG1 Meeting #94, R1-1809165, Gothenburg, Sweden, Aug. 11, 2018, pp. 1-5.
Huawei, HiSilicon: "Enhanced UL configured grant transmissions", 3GPP TSG RAN WG1 Meeting #95, R1-1812226, Spokane, USA, Nov. 3, 2018, pp. 1-10.
Notice of Allowance dated Apr. 11, 2024 for Chinese Patent Application No. 202080008892.3 and its English translation provided by Applicant's foreign counsel.

* cited by examiner

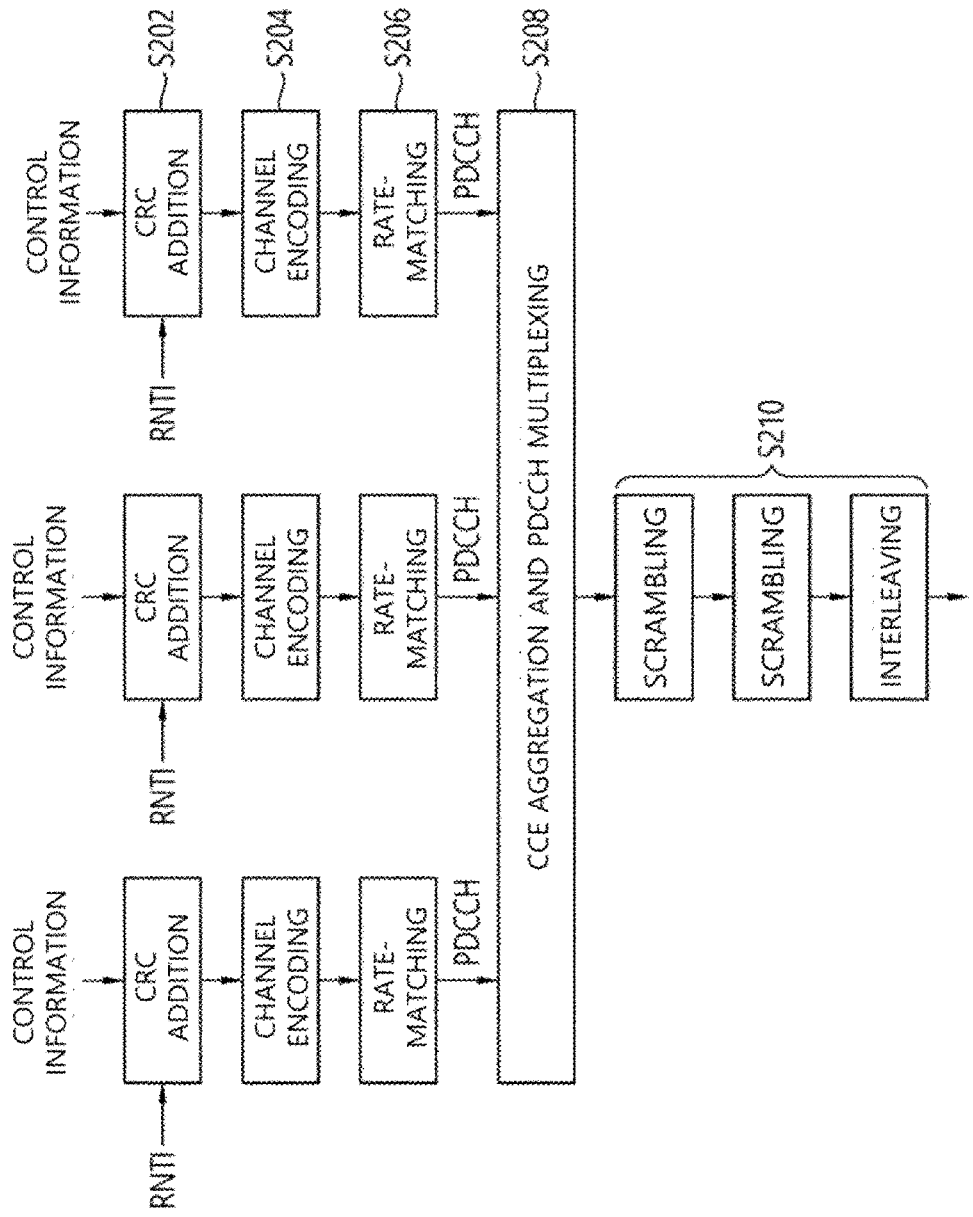

ethod for transmitting uplink shared channel in wireless communication system and device using same

CROSS-REFERENCE TO RELATED APPLICATIONS

This application is the U.S. National Stage of pending PCT International Application No. PCT/KR2020/000547, which was filed on Jan. 10, 2020, and which claims priority under 35 U.S.C 119(a) to Korean Patent Application No. 10-2019-0003578 filed with the Korean Intellectual Property Office on Jan. 10, 2019, Korean Patent Application No. 10-2019-0017303 filed with the Korean Intellectual Property Office on Feb. 14, 2019, Korean Patent Application No. 10-2019-0017490 filed with the Korean Intellectual Property Office on Feb. 14, 2019, and Korean Patent Application No. 10-2019-0037696 filed with the Korean Intellectual Property Office on Apr. 1, 2019. The disclosures of the above patent applications are incorporated herein by reference in their entirety.

TECHNICAL FIELD

The present disclosure relates to a wireless communication system and, specifically, to a method for transmitting an uplink shared channel in a wireless communication system, and a device using the same.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DISCLOSURE OF INVENTION

Technical Problem

An embodiment of the present disclosure provides a method for repetitively transmitting a physical uplink shared channel (PUSCH) to a base station by a terminal in a wireless communication system, and a terminal therefor.

Solution to Problem

According to an embodiment of the present disclosure, a method for transmitting a physical uplink shared channel (PUSCH) to a base station by a terminal in a wireless communication system may include: receiving a radio resource control (RRC) signal including configuration information relating to a semi-static uplink symbol, a flexible symbol, and a downlink symbol from the base station; receiving a physical downlink control channel (PDCCH) for scheduling PUSCH transmission including at least one PUSCH repetition; determining whether at least one of a required number of symbols for transmission of the PUSCH repetition corresponds to a case in which a PUSCH repetition is not allowed to be transmitted; and transmitting the PUSCH repetition to the base station on the basis of the determination on whether to correspond to the case in which the PUSCH repetition is not allowed to be transmitted.

According to an aspect, the case in which the PUSCH repetition is not allowed to be transmitted may include a case in which at least one of the symbols is a symbol designated as a semi-static downlink symbol by the configuration information.

According to an aspect, the transmitting of the PUSCH repetition may include transmitting the PUSCH repetition in a symbol remaining after excluding at least one symbol in which the PUSCH repetition is not allowed to be transmitted from among the required number of symbols for transmission of the PUSCH repetition.

According to an aspect, the case in which the PUSCH repetition is not allowed to be transmitted may further include a case in which at least one of the symbols is positioned before a slot boundary and at least one of the symbols is positioned after the slot boundary.

According to an aspect, the transmitting of the PUSCH repetition may include transmitting the PUSCH repetition in a fastest symbol among symbols in which the PUSCH repetition is allowed to be transmitted.

According to an aspect, the case in which the PUSCH repetition is not allowed to be transmitted may further include a case in which at least one of the symbols corresponds to a threshold number or less of flexible symbols subsequent to a semi-static downlink symbol.

According to an aspect, the case in which the PUSCH repetition is not allowed to be transmitted may further include a case in which at least one of the symbols is included in a synchronization signal (SS)/physical broadcast channel (PBCH) block transmission resource.

According to an aspect, the case in which the PUSCH repetition is not allowed to be transmitted may further include a case in which at least one of the symbols is a threshold number or less of flexible symbols subsequent to a synchronization signal (SS)/physical broadcast channel (PBCH) block transmission resource.

According to an aspect, the method may further include receiving information on at least one symbol in which the PUSCH repetition is not allowed to be transmitted, from the base station through an RRC signal, wherein the case in which the PUSCH repetition is not allowed to be transmitted may further include a case in which the information on the at least one symbol from the PDCCH indicates that the PUSCH repetition is not allowed to be transmitted.

According to an aspect, the transmitting of the PUSCH repetition is suspended in response to scheduling of a PUSCH having the same HARQ process number (HPN) as a PUSCH including the PUSCH repetition.

According to an aspect, the PDCCH may indicate a value from 0 to 13 as a start symbol position (S) of the PUSCH transmission, and indicate a value from 1 to 14 as a length (L) of a PUSCH for transmission, and a sum of S and L may have a value from 1 to 27.

According to another embodiment of the present disclosure, a terminal which transmits a physical uplink shared channel (PUSCH) to a base station in a wireless communication system includes: a communication module configured to receive a radio resource control (RRC) signal including configuration information relating to a semi-static uplink symbol, a flexible symbol, and a downlink symbol, receive a physical downlink control channel (PDCCH) for scheduling PUSCH transmission including at least one PUSCH repetition, or transmit PUSCH repetition to the base station; a memory configured to store a control program and data used by the terminal; and a processor configured to determine whether at least one of a required number of symbols for transmission of the PUSCH repetition corresponds to a case in which a PUSCH repetition is not allowed to be transmitted, and control transmission of the PUSCH repetition on the basis of the determination on whether to correspond to the case in which the PUSCH repetition is not allowed to be transmitted.

According to an aspect, the case in which the PUSCH repetition is not allowed to be transmitted may include a case in which at least one of the symbols is a symbol designated as a semi-static downlink symbol by the configuration information.

According to an aspect, the processor may control transmission of the PUSCH repetition so that the PUSCH repetition is transmitted in a symbol remaining after excluding at least one symbol in which the PUSCH repetition is not allowed to be transmitted from among the required number of symbols for transmission of the PUSCH repetition.

According to an aspect, the case in which the PUSCH repetition is not allowed to be transmitted may further include a case in which at least one of the symbols is positioned before a slot boundary and at least one of the symbols is positioned after the slot boundary.

According to an aspect, the processor may control transmission of the PUSCH repetition so that the PUSCH repetition is transmitted in a fastest symbol among symbols in which the PUSCH repetition is allowed to be transmitted.

According to an aspect, the case in which the PUSCH repetition is not allowed to be transmitted may further include a case in which at least one of the symbols corresponds to a threshold number or less of flexible symbols subsequent to a semi-static downlink symbol.

According to an aspect, the case in which the PUSCH repetition is not allowed to be transmitted may further include a case in which at least one of the symbols is included in a synchronization signal (SS)/physical broadcast channel (PBCH) block transmission resource.

According to an aspect, the case in which the PUSCH repetition is not allowed to be transmitted may further include a case in which at least one of the symbols is a threshold number or less of flexible symbols subsequent to a synchronization signal (SS)/physical broadcast channel (PBCH) block transmission resource.

According to an aspect, the communication module is further configured to receive information on at least one symbol in which the PUSCH repetition is not allowed to be transmitted, from the base station through an RRC signal, and the case in which the PUSCH repetition is not allowed to be transmitted may further include a case in which the information on the at least one symbol from the PDCCH indicates that the PUSCH repetition is not allowed to be transmitted.

According to an aspect, the processor may control transmission of the PUSCH repetition so that the transmission of the PUSCH repetition is suspended in response to scheduling of a PUSCH having the same HARQ process number (HPN) as a PUSCH including the PUSCH repetition.

According to an aspect, the PDCCH may indicate a value from 0 to 13 as a start symbol position (S) of the PUSCH transmission, and indicate a value from 1 to 14 as a length (L) of a PUSCH for transmission, and a sum of S and L may have a value from 1 to 27.

Advantageous Effects of Invention

According to an embodiment of the present disclosure, in a method for repetitively transmitting a PUSCH to a base station by a terminal in a wireless communication system, the terminal is allowed to repetitively transmit the PUSCH to the base station as promptly as possible, whereby a target performance in the 5G wireless communication system for providing a low-latency and high-reliable service can be achieved.

Advantageous effects obtainable from the present disclosure are not limited to the above-mentioned advantageous effects, and other advantageous effects not mentioned herein will be clearly understood from the following description by those skilled in the art to which the present disclosure pertains.

BRIEF DESCRIPTION OF DRAWINGS

FIGS. 5a and 5b illustrate a procedure for transmitting control information and a control channel in a 3GPP NR system.

BEST MODE FOR CARRYING OUT THE INVENTION

Figure 1:
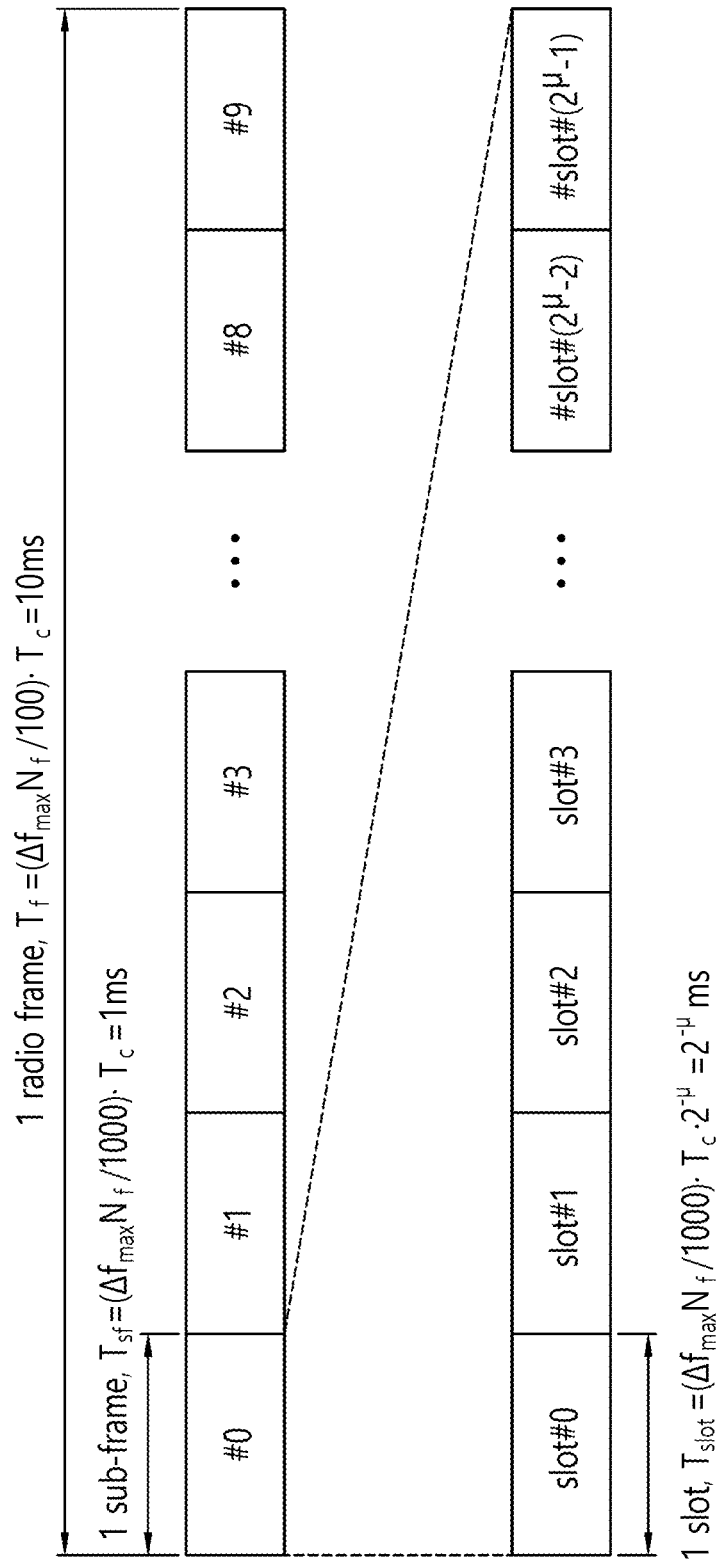
FIG. 1 illustrates an example of a wireless frame structure used in a wireless communication system.

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the present disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified in this specification, a base station may refer to a next generation node B (gNB) as defined in 3GPP NR. Furthermore, unless otherwise specified, a terminal may refer to a user equipment (UE). Hereinafter, in order to facilitate understanding of the description, each content is separately divided into embodiments and described, but each of the embodiments may be used in combination with each other. In the present disclosure, the configuration of the UE may indicate configuration by the base station. Specifically, the base station may transmit a channel or signal to the UE to configure an operation of the UE or a parameter value used in a wireless communication system.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100)*T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one subframe. Each subframe has a length of 1 ms and may include one or more slots according to a subcarrier spacing. More specifically, in the 3GPP NR system, the subcarrier spacing that may be used is $15*2^\mu$ kHz, and p can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe number), and a slot number (or a slot index).

Figure 2:
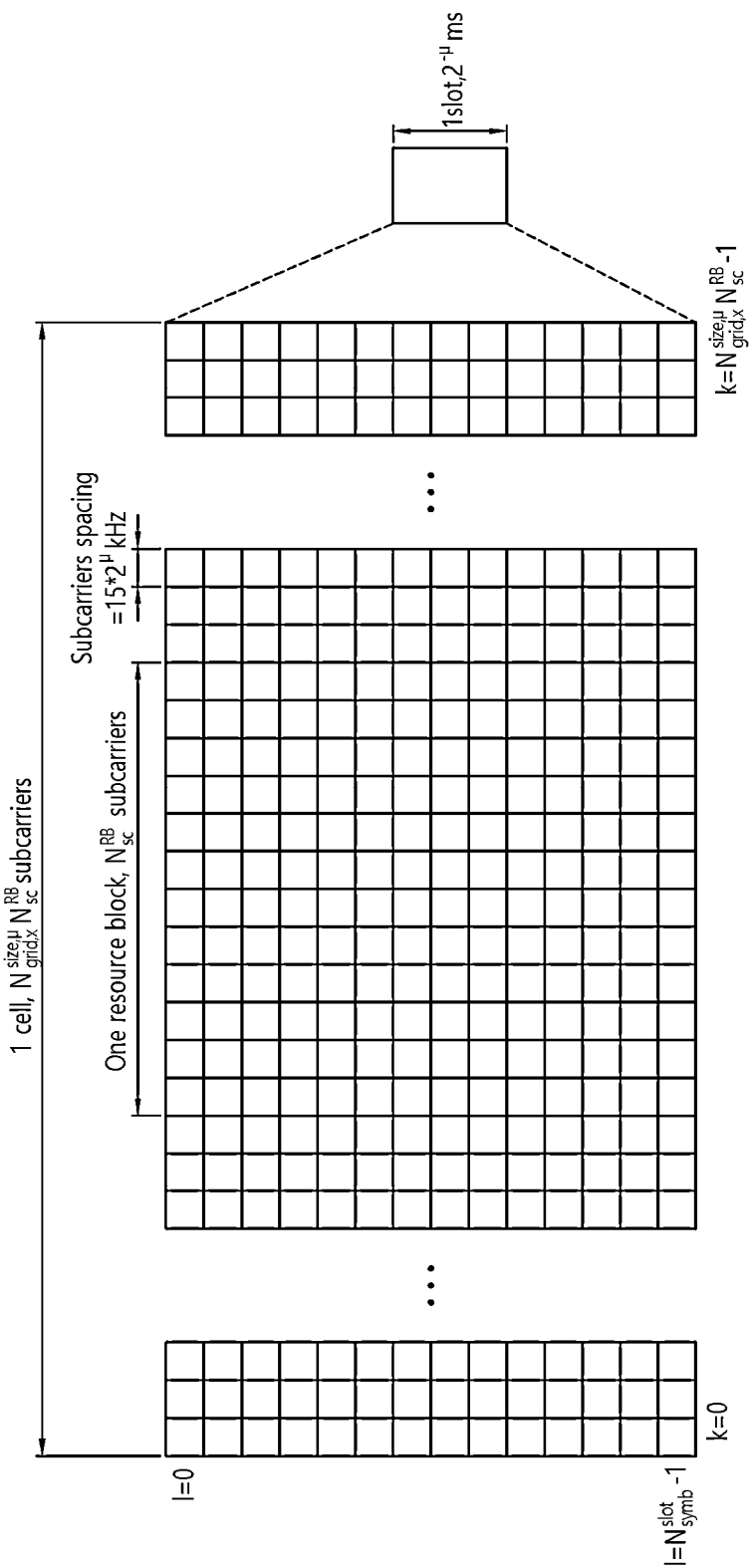
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e.g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\mu}_{grid,x}*N^{RB}_{sc}-1$ in the frequency domain, and l may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

Figure 3:
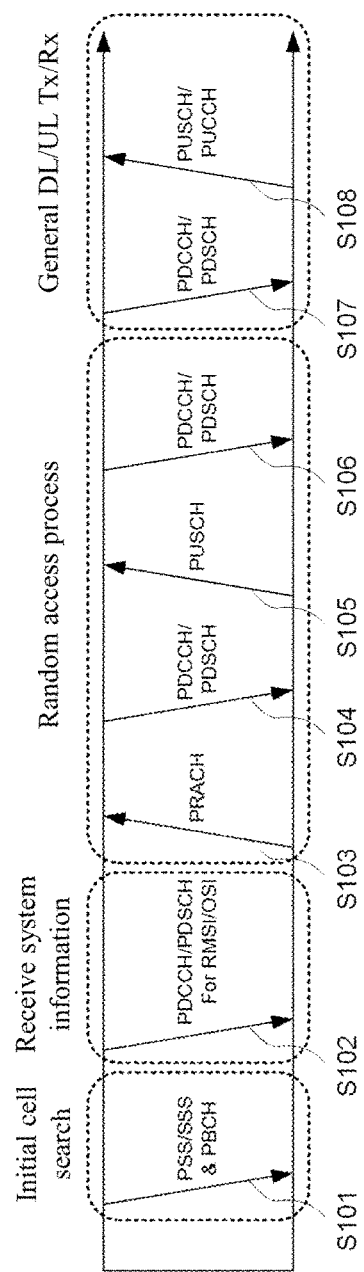
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Here, the system information received by the UE is cell-common system information for the UE to properly operate at the physical layer in Radio Resource Control (RRC), and is referred to as remaining system information (RSMI) or system information block (SIB) 1.

When the UE initially accesses the base station or does not have radio resources for signal transmission (when the UE is in RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. During the random access process, the UE may obtain UE-specific system information necessary for the UE to properly operate at the physical layer in the RRC layer. When the UE obtains UE-specific system information from the RRC layer, the UE enters the RRC_CONNECTED mode.

The RRC layer is used for message generation and management for control between a UE and a radio access network (RAN). More specifically, in the RRC layer, the base station and the UE may perform broadcasting of cell system information, delivery management of paging messages, mobility management and handover, measurement report and control thereof, UE capability management, and storage management including existing management necessary for all UEs in the cell. In general, since the update of the signal (hereinafter, referred to as RRC signal) transmitted from the RRC layer is longer than the transmission/reception period (i.e., transmission time interval, TTI) in the physical layer, the RRC signal may be maintained unchanged for a long period.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Figure 4A:
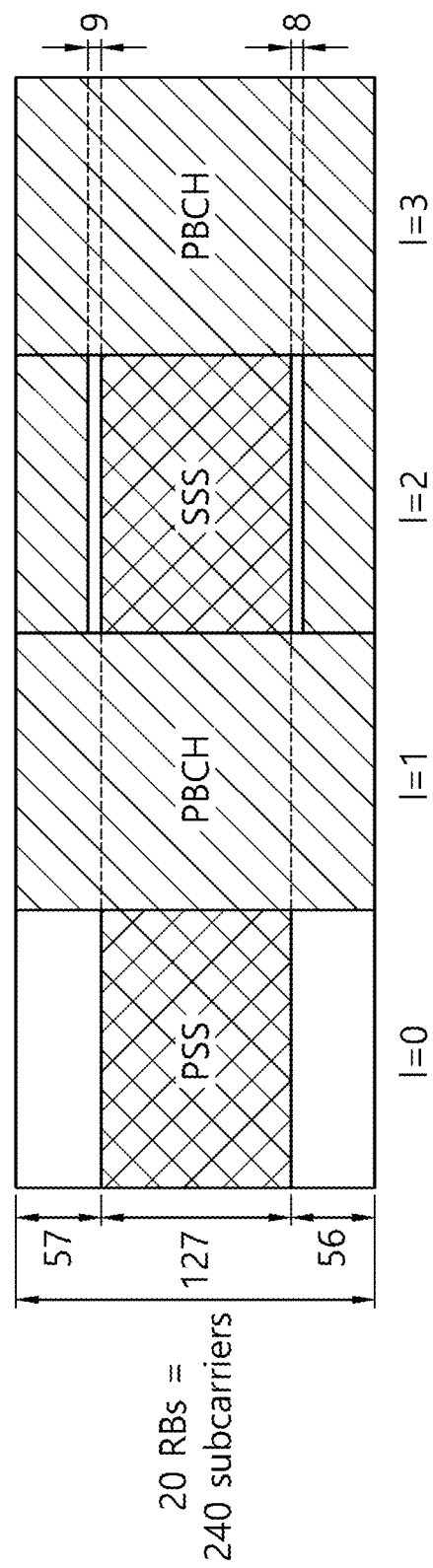
FIGS. 4a and 4b illustrate an SS/PBCH block for initial cell access in a 3GPP NR system.

Referring to FIG. 4a, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4a and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 1

| Channel or signal | OFDM symbol number l relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v, 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n)=1-2\times(m)$$

$$m=(n+43N^{(2)}_{ID}) \bmod 127$$

$$0 \le n < 127$$

Here, $x(i+7)=(x(i+4)+x(i)) \bmod 2$ and is given as,
[x(6) x(5) x(4) x(3) x(2) x(1) x(0)]=[1 1 1 0 1 0]
Further, the sequence $d_{SSS}(n)$ of the SSS as follows.

$$d_{SSS}(n)=[1-2x_0((n+m_0) \bmod 127][1-2x_1((n+m_1) \bmod 127]$$

$$m_0=15 \text{ floor } (N^{(1)}_{ID}/112)+5N^{(2)}_{ID}$$

$$m1=N^{(1)}_{ID} \bmod 112$$

$$0 \le n < 127$$

Figure 4B:
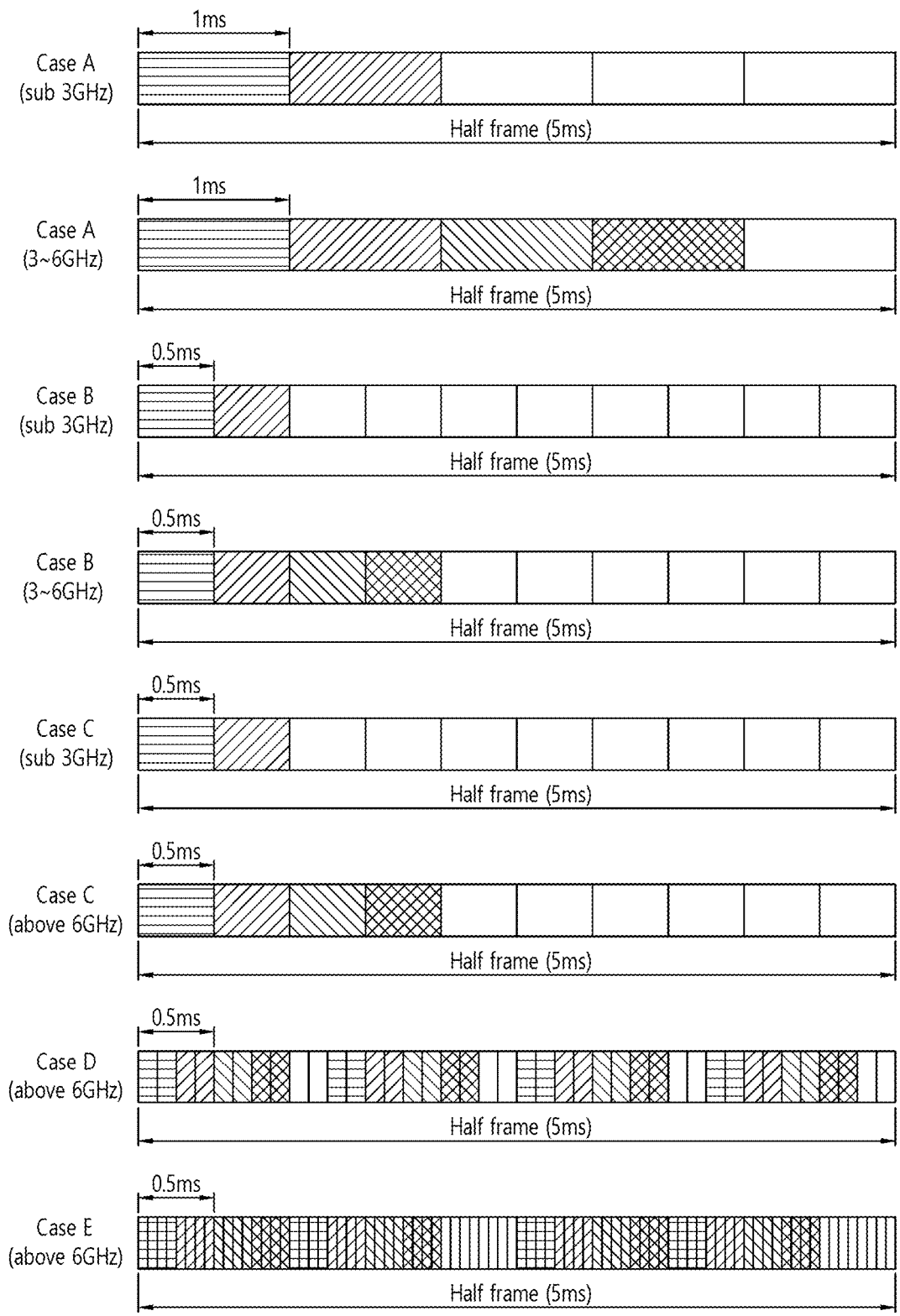

Here, $x_1(i+7)=(x_0(i+4)+x_0(i)) \bmod 2$
$x_1(i+7)=(x_1(i+1)+x_1(i)) \bmod 2$ and is given as,
$[x_0(6)x_0(5)x_0(4)x_0(3)x_0(2)x_0(1)x_0(0)]=[0\ 0\ 0\ 0\ 0\ 0\ 1]$
$[x_1(6)x_1(5)x_1(4)x_1(3)x_1(2)x_1(1)x_1(0)]=[0\ 0\ 0\ 0\ 0\ 0\ 1]$ A radio frame with a 10 ms length may be divided into two half frames with a 5 ms length. Referring to FIG. 4b, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5B:
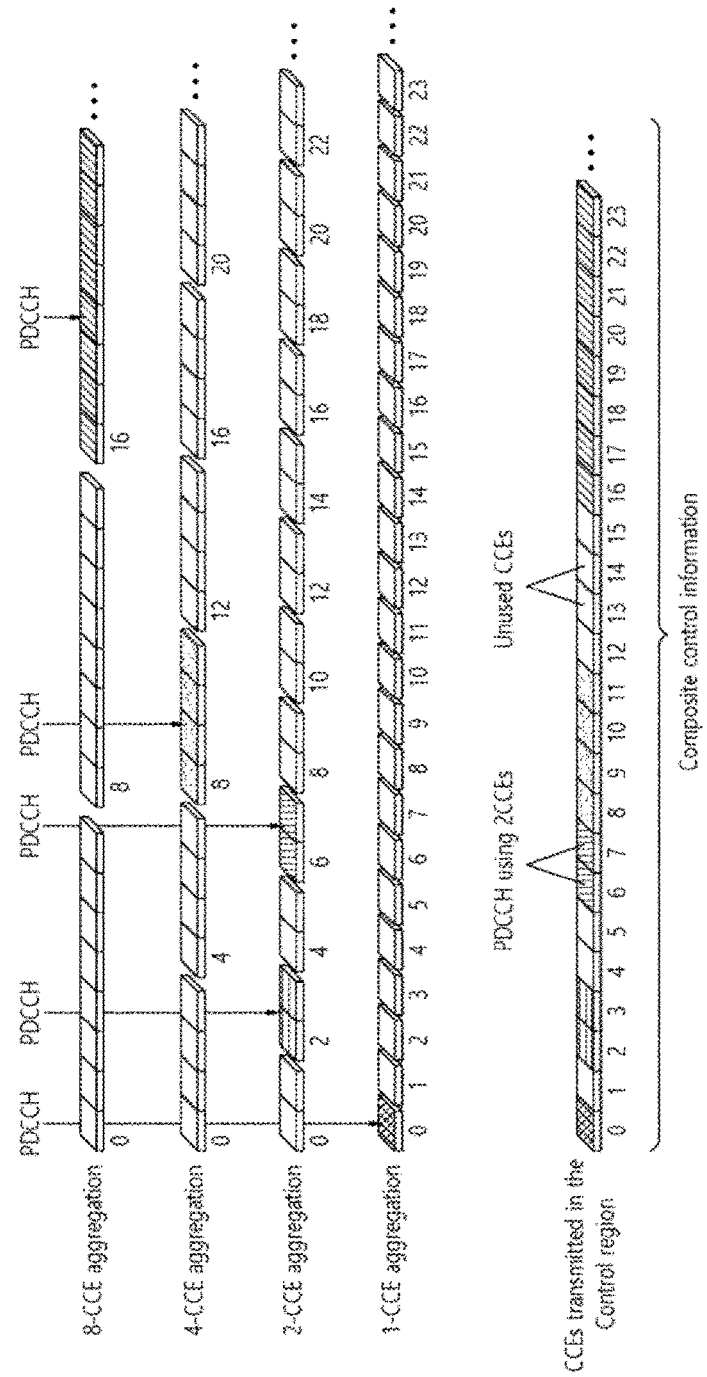

FIG. 5 illustrates a procedure for transmitting control information and a control channel in a 3GPP NR system. Referring to FIG. 5a, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5b is a diagram related to a CCE aggregation level and the multiplexing of a PDCCH and illustrates the type of a CCE aggregation level used for one PDCCH and CCE(s) transmitted in the control area according thereto.

Figure 6:
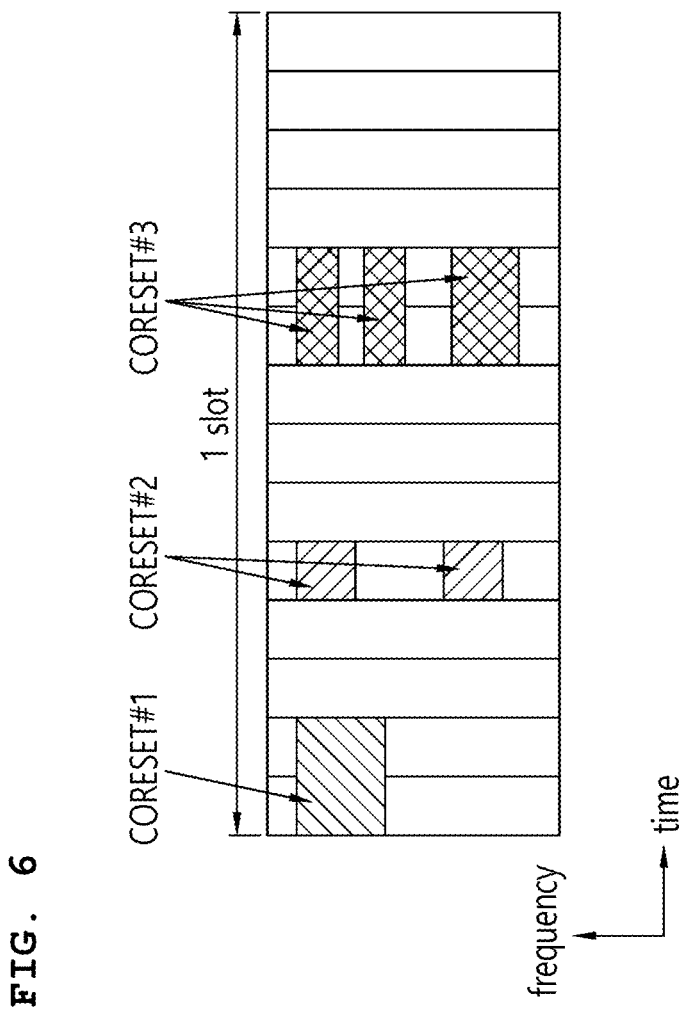
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
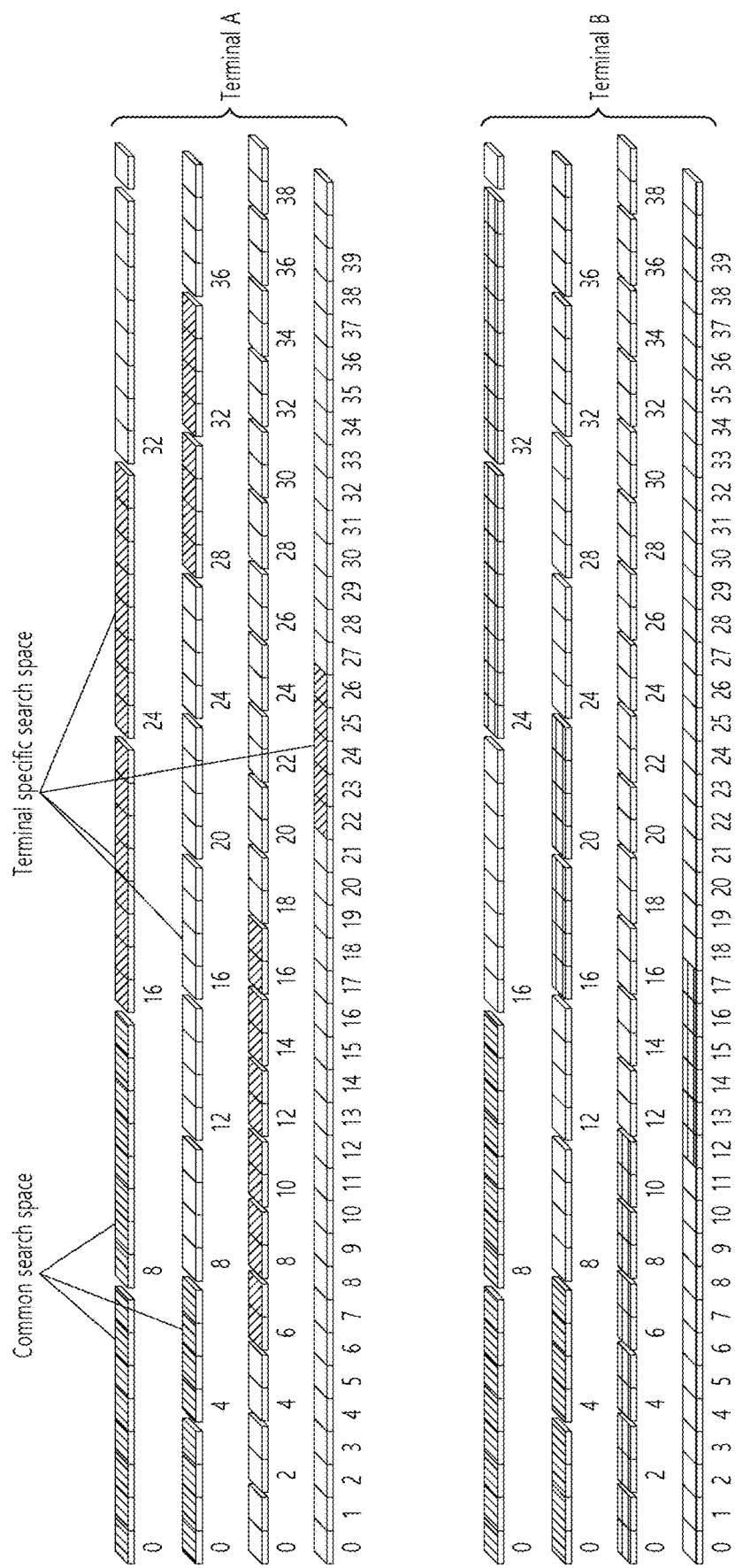
FIG. 7 illustrates a method for configuring a PDCCH search space in a 3GPP NR system.

FIG. 7 illustrates a method for setting a PUCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a Terminal-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 2 shows an embodiment of a physical uplink control channel (PUCCH) used in a wireless communication system.

TABLE 2

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of transmitting 1-bit or 2-bit HARQ-ACK information or SR. PUCCH format 0 can be transmitted through one or two OFDM symbols on the time axis and one RB on the frequency axis. When PUCCH format 0 is transmitted in two OFDM symbols, the same sequence to the two symbols may be transmitted through different RBs. In this case, the sequence may be a cyclic shift (CS) sequence from the base sequence used for PUCCH format 0. Through this, the UE can obtain a frequency diversity gain. Specifically, the UE may determine a cyclic shift (CS) value $m_{cs}$ according to the $M_{bit}$ bit UCI ($M_{bit}$=1 or 2). In addition, a sequence in which a base sequence of length 12 is cyclically shifted based on a predetermined CS value $m_{cs}$ may be mapped to 1 OFDM symbol and 12 REs of 1 RB and transmitted. When the number of cyclic shifts available to the UE is 12 and $M_{bit}$=1, 1 bit UCI 0 and 1 may be mapped to two cyclic shifted sequences having a difference of 6 cyclic shift values, respectively. In addition, when $M_{bit}$=2, 2 bits UCI 00, 01, 11, and 10 may be mapped to four cyclic shifted sequences in which the difference in cyclic shift values is 3, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI (Mbit>2) with n/2-Binary Phase Shift Keying (BPSK) or QPSK to generate a complex valued symbol d(0) to d($M_{symb}$−1). Here, when using n/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, the UE may perform transmission/reception using a bandwidth less than or equal to the bandwidth of the carrier (or cell). To this end, the UE may be configured with a bandwidth part (BWP) consisting of a continuous bandwidth of a portion of the bandwidth of the carrier. A UE operating according to TDD or operating in an unpaired spectrum may receive up to four DL/UL BWP pairs for one carrier (or cell). In addition, the UE may activate one DL/UL BWP pair. A UE operating according to FDD or operating in a paired spectrum may receive up to 4 DL BWPs on a downlink carrier (or cell) and up to 4 UL BWPs on an uplink carrier (or cell). The UE may activate one DL BWP and UL BWP for each carrier (or cell). The UE may not receive or transmit in time-frequency resources other than the activated BWP. The activated BWP may be referred to as an active BWP.

The base station may indicate an activated BWP among the BWPs configured by the UE through downlink control information (DCI). The BWP indicated through DCI is activated, and other configured BWP(s) are deactivated. In a carrier (or cell) operating in TDD, the base station may include a bandwidth part indicator (BPI) indicating the BWP activated in the DCI scheduling the PDSCH or PUSCH to change the DL/UL BWP pair of the UE. The UE may receive a DCI scheduling a PDSCH or a PUSCH and may identify a DL/UL BWP pair activated based on the BPI. In the case of a downlink carrier (or cell) operating in FDD, the base station may include a BPI indicating the activated BWP in the DCI scheduling the PDSCH to change the DL BWP of the UE. In the case of an uplink carrier (or cell) operating in FDD, the base station may include a BPI indicating the activated BWP in the DCI scheduling the PUSCH to change the UL BWP of the UE.

Figure 8:
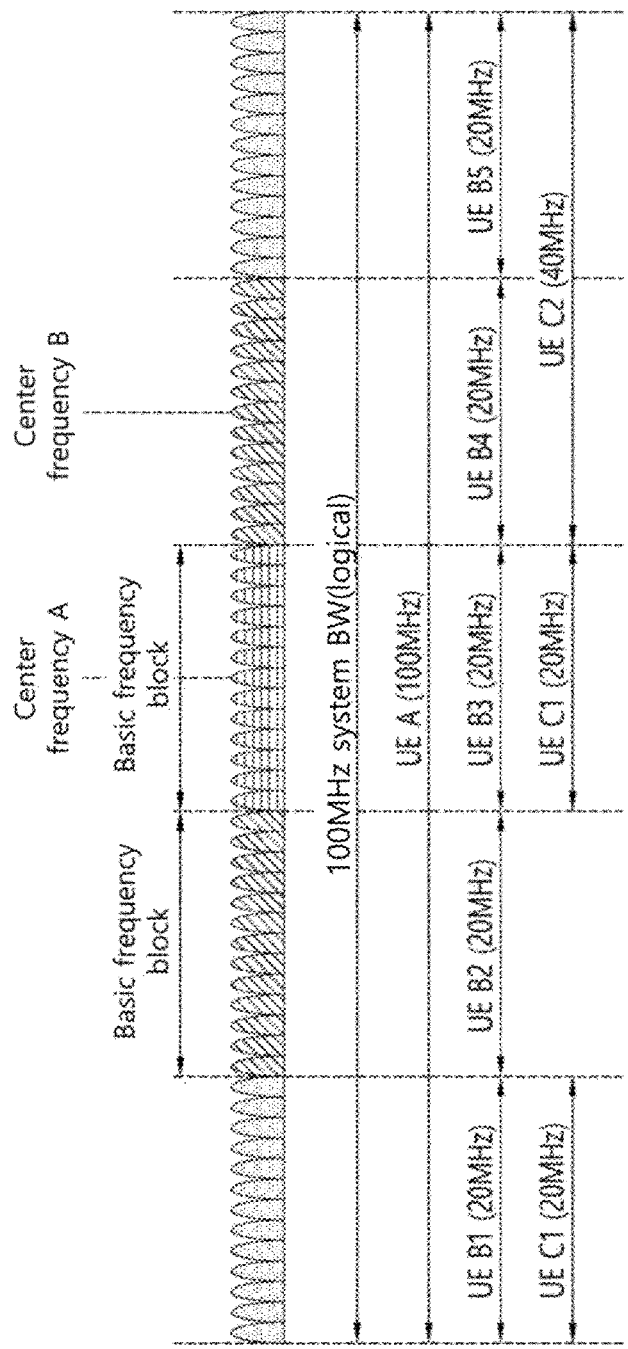
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1 \sim B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
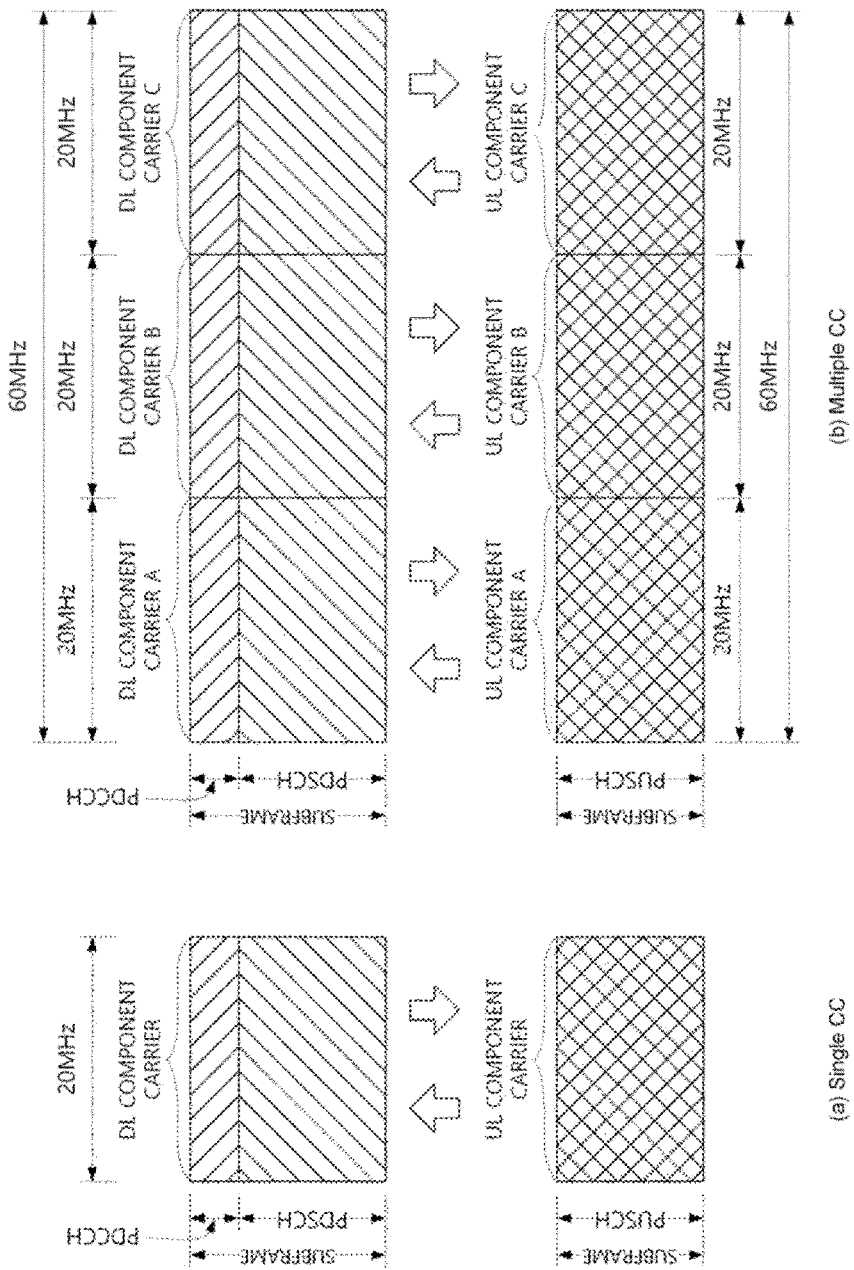
FIG. 9 is a diagram for explaining signal carrier communication and multiple carrier communication.

FIG. 9 is a drawing for explaining signal carrier communication and multiple carrier communication. Particularly, FIG. 9(a) shows a single carrier subframe structure and FIG. 9(b) shows a multi-carrier subframe structure.

Referring to FIG. 9(a), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9(b), three 20 MHz component carriers (CCs) can be aggregated into each of UL and DL, so that a bandwidth of 60 MHz can be supported.

Each CC may be adjacent or non-adjacent to one another in the frequency domain. FIG. 9(b) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
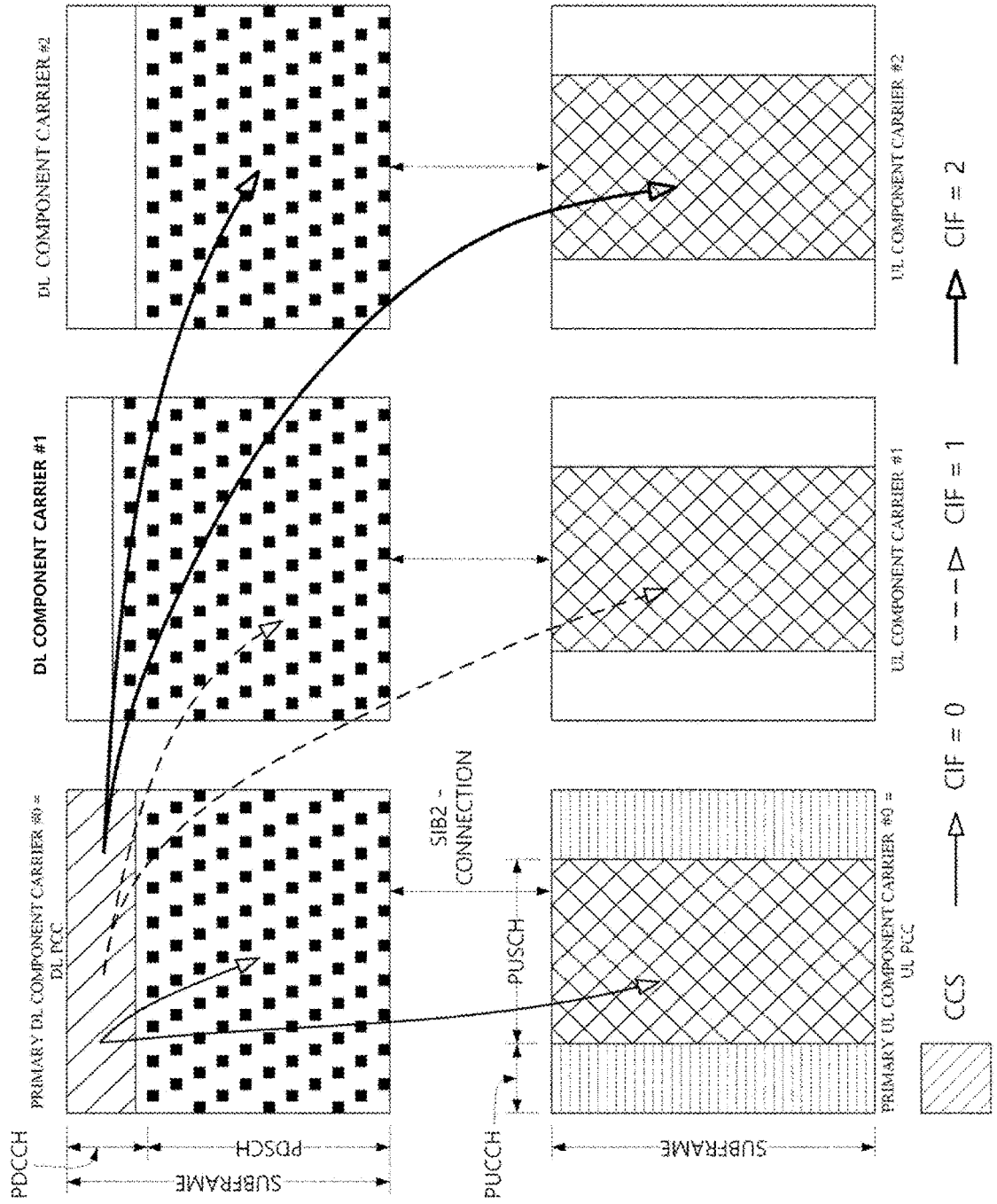
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
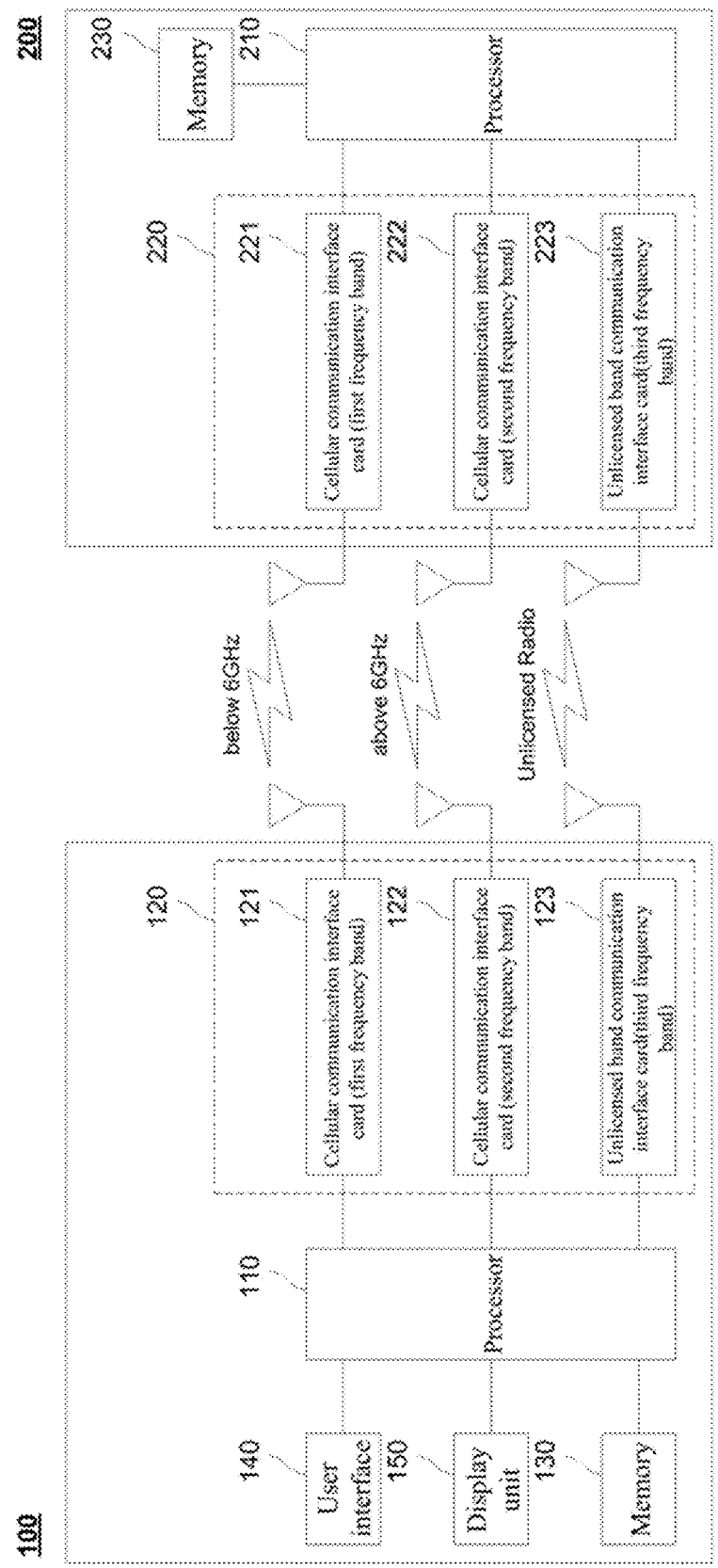
FIG. 11 is a block diagram showing the configurations of a UE and a base station according to an embodiment of the present disclosure.

FIG. 11 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

SSB Reception in SMTC

An illustrative problem to be solved by the present disclosure relates to reception of a synchronization signal block (SSB) in an SSB measurement time configuration (SMTC). A UE of this embodiment corresponds to the UE 100 of FIG. 11. Accordingly, each operation of the UE in this embodiment may be performed by the processor 110 or the communication module 120 of the UE 100. A base station of this embodiment corresponds to the base station 200 of FIG. 11. Accordingly, each operation of the base station in this embodiment may be performed by the processor 210 or the communication module 220 of the base station 200.

The UE is required to be capable of performing measurement without a measurement gap when an SSB is completely included in an active bandwidth part. There may be a restriction on scheduling flexibility on frequency range FR2 or when subcarrier spacing of a measurement signal is different from that of a PDSCH/PDCCH.

Specifically, when the subcarrier spacing of the measurement signal is identical to that of the PDSCH/PDCCH on frequency range FR1, there is no restriction on scheduling flexibility. When the subcarrier spacing of the measurement signal is different from that of the PDSCH/PDCCH on frequency range FR1, there may be a restriction on scheduling flexibility as follows. First, when the UE is able to receive a data signal with the SSB having different subcarrier spacings (that is, when the UE supports simultaneousRxDataSSB-DiffNumerology), there is no restriction on scheduling availability. On the other hand, when the UE is not able to receive a data signal with the SSB having different subcarrier spacings (that is, when the UE does not support simultaneousRxDataSSB-DiffNumerology), there is a restriction on scheduling availability for the UE. In this case, the following scheduling availability restriction is applied for SS-RSRP/RSRQ/SINR measurement.

1) If deriveSSB_IndexFromCell is enabled, the UE does not expect to receive a PDCCH/PDSCH or transmit a PUCCH/PUSCH in consecutive SSB symbols and in one symbol immediately before and immediately after the consecutive SSB symbols within an SMTC window.

2) If deriveSSB_IndexFromCell is disabled, the UE does not expect to receive a PDCCH/PDSCH or transmit a PUCCH/PUSCH in all symbols within the SMTC window.

Here, the deriveSSB_IndexFromCell indicates whether the UE is able to use a timing of a cell having the same SSB frequency and subcarrier spacing to derive an SSB index of a cell for the indicated SSB frequency and subcarrier spacing.

On frequency range FR2, the following scheduling availability restriction is applied for SS-RSRP/SINR measurement.

1) The UE does not expect to receive a PDCCH/PDSCH or transmit a PUCCH/PUSCH in consecutive SSB symbols and in one symbol immediately before and immediately after the consecutive SSB symbols within an SMTC window.

On frequency range FR2, the following scheduling availability restriction is applied for SS-RSRQ measurement.

1) The UE does not expect to receive a PDCCH/PDSCH or transmit a PUCCH/PUSCH in consecutive SSB symbols, RSSI measurement symbols, and one symbol immediately before and immediately after the consecutive SSB/RSSI symbols within an SMTC window.

In the above description, when smtc2 is configured via a higher-layer, the SMTC window follows smtc2, and otherwise, the SMTC window follows smtc1.

A problem to be solved by the present disclosure is determining a slot for repetitively transmitting a PUCCH in accordance with scheduling availability restriction when there is a restriction on the scheduling availability for the UE to receive a measurement signal. More specifically, when the UE is configured to repetitively transmit the PUCCH k times, the UE is to determine k slots to be used to repetitively transmit the PUCCH.

It is assumed that the UE is configured with dual connectivity or carrier aggregation of performing transmission by grouping two or more cells. It is also assumed that the UE is configured with two cells. The following description may be applied to a case in which the UE is configured with two or more cells. One of the two cells is referred to as a "Pcell". The Pcell corresponds to a cell in which the UE transmits the PUCCH. The other of the two cells is referred to as an "Scell". The Scell corresponds to a cell in which the UE does not transmit the PUCCH. A measurement signal may be configured for the Scell.

A MeasObjectNR information element (IE) may be configured for the UE via a higher-layer. The MeasObjectNR IE includes information for intra/inter-frequency measurement. The ssbFrequency included in the MeasObjectNR IE indicates the frequency of the SSB, ssbFrequencySpacing indicates the subcarrier spacing of the SSB, and the ssb-ToMeasure indicates information on the time-domain configuration of the SSB to be measured. The smtc1 or the smtc2 included in the MeasObjectNR IE indicates the configuration of the SMTC window.

According to an embodiment of the present disclosure, when the UE is configured to repetitively transmit the PUCCH in K slots, a method for determining the K slots for transmitting the PUCCH is as follows. According to the first method, when symbols to which the PUCCH transmission is allocated in one slot overlap a measurement signal (an SSB configured by the MeasObjectNR) within the SMTC window, the UE does not include the slot in the K slots for transmitting the PUCCH. According to the second method, when symbols to which the PUCCH transmission is allocated overlap a measurement signal (an SSB configured by the MeasObjectNR) within the SMTC window and one symbol immediately after the measurement signal in one slot, the UE does not include the slot in the K slots for transmitting the PUCCH. According to the third method, when symbols to which the PUCCH transmission is allocated overlap a measurement signal (an SSB configured by the MeasObjectNR) within the SMTC window and one symbol immediately after or before the measurement signal in one slot, the UE does not include the slot in the K slots for transmitting the PUCCH. Additionally, the operation above is applicable only when there is a restriction on the scheduling availability.

According to another embodiment of the present disclosure, when the UE is configured to repetitively transmit the PUCCH in K slots and determines K slots for transmitting the PUCCH, the PUCCH transmission within the SMTC window is as follows. According to the first method, when symbols to which the PUCCH transmission is allocated overlap a measurement signal (an SSB configured by the MeasObjectNR) within the SMTC window and one symbol immediately after the measurement signal in one slot, the UE does not transmit the PUCCH in the slot. According to the second method, when symbols to which the PUCCH transmission is allocated overlap a measurement signal (an SSB configured by the MeasObjectNR) within the SMTC window and one symbol immediately after the measurement signal in one slot, the UE does not transmit the PUCCH in the slot. According to the third method, when symbols to which the PUCCH transmission is allocated overlap a measurement signal (an SSB configured by the MeasObjectNR) within the SMTC window and one symbol immediately after or immediately before the measurement signal in one slot, the UE does not transmit the PUCCH in the slot. Additionally, the operation above is applicable only when there is a restriction on the scheduling availability.

Another problem to be solved by the present disclosure is to determine a slot for repetitive PUCCH transmission in a situation in which the UE has a half-duplex capability only. When the UE has a half-duplex capability only, the UE is not able to simultaneously perform transmission and reception. That is, when the UE performs transmission in one cell, the UE is not able to perform reception in another cell. In addition, when the UE performs reception in one cell, the UE is not able to perform transmission in another cell. Accordingly, the UE should operate in one direction only among transmission and reception. More specifically, a problem to be solved is a method for determining K slots in which the UE transmits the PUCCH when there is a measurement signal to be received in the Pcell/Scell by the UE, and the UE is configured to repetitively transmit the PUCCH in the Pcell in K slots. When the UE determines K slots for transmitting the PUCCH in the Pcell without considering the measurement signal to be received in the Pcell/Scell, the UE is to transmit the PUCCH in the Pcell and is to receive the measurement signal in the Pcell/Scell in some slots. The operation is allowed for the UE having a full-duplex capacity, but is not allowed for the UE having a half-duplex capacity. Accordingly, the UE should consider the measurement signal of the Pcell/Scell to determine a slot for transmitting the PUCCH.

According to an embodiment of the present disclosure, in a method for determining K slots for repetitively transmitting the PUCCH by the UE having a half-duplex capacity, when symbols to which the PUCCH transmission is allocated overlap a measurement signal of the Pcell/Scell within the SMTC window in one slot, the UE may exclude the slot from the K slots for repetitively transmitting the PUCCH.

According to an embodiment of the present disclosure, in a method for determining K slots for repetitively transmitting the PUCCH by the UE having a half-duplex capacity, when symbols to which the PUCCH transmission is allocated overlap a measurement signal of the Pcell/Scell within the SMTC window and one symbol immediately after the measurement signal in one slot, the UE may exclude the slot from the K slots for repetitively transmitting the PUCCH.

According to an embodiment of the present disclosure, in a method for determining K slots for repetitively transmitting the PUCCH by the UE having a half-duplex capacity, when symbols to which the PUCCH transmission is allocated overlap a measurement signal of the Pcell/Scell within the SMTC window and one symbol immediately after or immediately before the measurement signal in one slot, the UE may exclude the slot from the K slots for repetitively transmitting the PUCCH.

Here, the measurement signal may include an SSB configured by the MeasObjectNR. In addition, the measurement signal may include a CSI-RS configured by the MeasObjectNR. Here, the CSI-RS may be configured through csi-rs-ResourceConfigMobility among the MeasObjectNR IE.

PUSCH Repetition Transmission

In the enhanced ultra-reliable low-latency communication (eURLLC) that is being developed in the 3GPP NR release 16, various technologies for providing a low latency and high reliable service have been discussed. Particularly, in an uplink case, in order to reduce latency and increase reliability, a scheme for repetitively transmitting a physical uplink shared channel (PUSCH) to the base station by the UE as promptly as possible will be supported. According to an aspect of the present disclosure, a scheme for repetitively transmitting a PUSCH by the UE as promptly as possible is disclosed.

In general, the UE receives scheduling information of the PUSCH from the base station. The scheduling information of the PUSCH may be received via, for example, a PDCCH (or DCI). The UE transmits the PUSCH via the uplink on the basis of the received scheduling information. In this case, the UE may identify a time-frequency resource in which the PUSCH is to be transmitted by using time domain resource assignment (TDRA) and frequency domain resource assignment (FDRA) for PUSCH transmission, which are included in the DCI. A time resource in which the PUSCH is transmitted includes consecutive symbols, and one PUSCH may not be scheduled exceeding the slot boundary.

In the 3GPP NR release 15, repetitive transmission of the PUSCH between slots is supported. First, the UE may be configured with the repetition transmission number by the base station. It is assumed that a value of the repetition transmission number configured for the UE is K. When the UE is indicated to receive a PDCCH (or DCI) for scheduling the PUSCH in slot n and transmit the PUSCH in slot n+k, the UE may transmit the PUSCH in K consecutive slots from slot n+k. That is, the UE may transmit the PUSCH in slot n+k, slot n+k+1, . . . , and slot n+k+K−1. In addition, the time and frequency resource in which the PUSCH is transmitted in each slot is identical to what is indicated by the DCI. That is, the PUSCH may be transmitted in the same symbol and the same PRB in the slot. In the frequency area, the frequency hopping may be configured for the UE to acquire a diversity gain. The frequency hopping may be configured as intra-slot frequency hopping for performing frequency hopping in a slot and as inter-slot frequency hopping for performing the frequency hopping for each slot. When the intra-slot frequency hopping is configured for the UE, the UE divides the PUSCH in half in each slot in the time domain, transmits one half in the scheduled PRB, and transmits the other half in a PRB acquired by adding an offset value to the scheduled PRB. Here, the offset value may be configured with two values or four values via a higher-layer, and one of the values may be indicated via DCI. When the inter-slot frequency hopping is configured for the UE, the UE may transmit the PUSCH in the scheduled PRB in the odd-numbered slot in which the PUSCH is transmitted, and transmits the PUSCH in a PRB obtained by adding an offset value to the scheduled PRB in the even-numbered slot. When the UE performs repetitive transmission in a slot and a symbol in which the PUSCH is to be transmitted is configured with a semi-static DL symbol in a particular slot, the UE does not transmit the PUSCH in the slot. The PUSCH that has failed to be transmitted is not deferred to another slot and is not transmitted.

Reasons why the above-described repetitive transmission in the Release 15 is not suitable for eURLLC service provision are described below.

First, it is difficult to provide a high-reliable service. For example, if one slot includes 14 symbols, and the PUSCH is transmitted in symbol 12 and symbol 13, then the PUSCH is repetitively transmitted in symbol 12 and symbol 13 in the next slot. Transmission is allowed to be performed in symbols 1 to 11 in the next slot, but the transmission is not performed, whereby it is difficult to achieve high-reliability.

Next, it is difficult to provide a high-level of low-latency service. For example, it is assumed that one slot includes 14 symbols, and the PUSCH is transmitted in symbols 0 to 13 to achieve high-reliability. The last symbol of the PUSCH, i.e., symbol 13, is to be received so that the base station may successfully receive the PUSCH. Accordingly, a problem of increasing the latency according to the length of the PUSCH occurs.

In order to solve the problems above, according to an aspect of the present disclosure, a method for repetitively transmitting a PUSCH in one slot is disclosed. More specifically, the UE may consecutively and repetitively transmit the scheduled PUSCH. Here, the meaning of "consecutively" transmitting the scheduled PUSCH is that a PUSCH is transmitted again in a symbol immediately after a symbol in which transmission of one PUSCH ends. This method may be referred to as "mini-slot-level PUSCH repetition", and a repetition method in the above-described 3GPP NR Release 15 may be referred to as "slot-level PUSCH transmission method".

The mini-slot-level PUSCH repetition transmission may solve the above-described problem of the slot-level PUSCH repetition transmission method.

First, a high-reliable service may be provided. For example, if one slot includes 14 symbols, and the PUSCH is transmitted in symbol 12 and symbol 13, then the PUSCH is repetitively transmitted in symbol 1 and symbol 2 in the next slot. Accordingly, the transmission is consecutively performed, whereby high-reliability may be achieved.

However, it is difficult to provide a high-level of low-latency service. For example, it is assumed that one slot includes 14 symbols, and the PUSCH is transmitted in symbol 0 and symbol 1 to achieve high-reliability. The PUSCH may be transmitted again in symbol 2 and symbol 3, and may be repetitively transmitted in symbol 4 and symbol 5 since repetition transmission is performed in the slot. Accordingly, the same reliability as that in a case in which the PUSCH having the length of 14 in one slot is transmitted. However, in this case, the base station may successfully receive the PUSCH in the middle of the repetition transmission according to the channel situation instead of successfully receiving the PUSCH once all the repetition transmissions are received. Therefore, according to the situation, the latency may be reduced since the PUSCH is successfully received after symbol 2 in which the first repetition transmission ends.

An illustrative problem to be solved by the present disclosure relates to a case in which mini-slot-level PUSCH repetition transmission is continuously performed in another slot, exceeding one slot. As described above, in a case of the mini-slot-level PUSCH repetition transmission, in a symbol immediately after a symbol in which one PUSCH transmission ends, the next PUSCH repetition transmission starts. However, in the following situations, transmission may not be performed consecutively.

The first situation is a case in which symbols occupied by the PUSCH overlap a semi-static DL symbol when the PUSCH is transmitted in a symbol immediately after a symbol in which PUSCH transmission ends. In this case, a symbol for transmitting the PUSCH overlaps the semi-static DL symbol, and thus the PUSCH may not be transmitted in a symbol immediately after the overlapping symbol. Accordingly, the PUSCH is to be repetitively transmitted in another symbol.

The second situation is a case in which the PUSCH exceeds the slot boundary when the PUSCH is transmitted in a symbol immediately after a symbol in which the PUSCH transmission ends. It is not allowed for one PUSCH to exceed the slot boundary, and thus the PUSCH is transmitted in another symbol.

According to an aspect of the present disclosure, a PUSCH repetition transmission method considering the situations above is disclosed.

According to an embodiment of the present disclosure, when the UE is configured to perform mini-slot-level PUSCH repetition transmission, the UE transmits the PUSCH in a symbol immediately after one PUSCH transmission. In this case, when the PUSCH fails to be transmitted (as described above, for example, a symbol for transmitting the PUSCH overlaps the semi-static DL symbol, or exceeds the slot boundary), the UE may perform PUSCH transmission in a fastest symbol among symbols in which the transmission may be performed, or may perform the PUSCH repetition transmission in a symbol remaining after excluding the symbol in which the PUSCH repetition transmission may not be performed. Here, the fastest symbol among symbols in which the transmission may be performed corresponds to, for example, a case in which the PUSCH neither overlaps the semi-static DL symbol nor exceeds the slot boundary.

Figure 12:
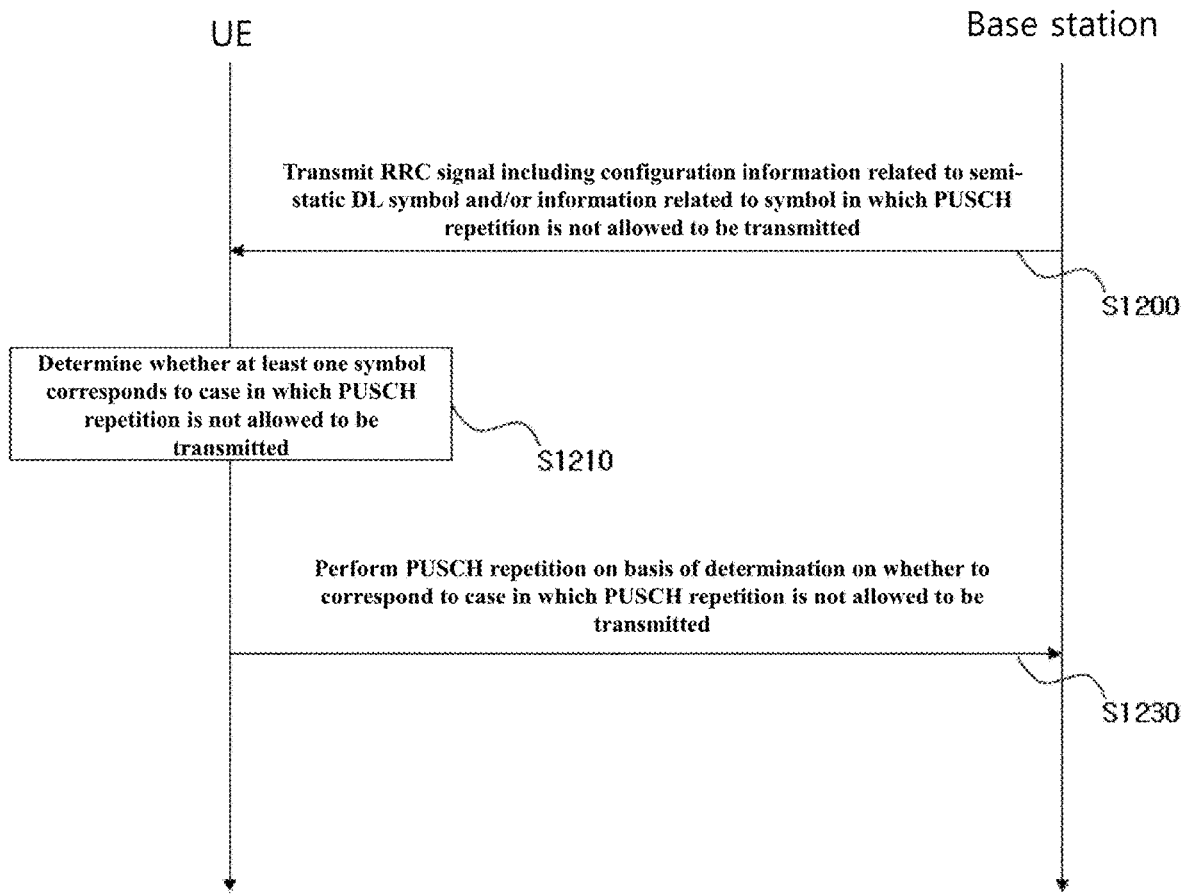
FIG. 12 is a flow chart illustrating a method for transmitting a PUSCH repetition to a base station by a terminal in a wireless communication system according to an embodiment.

FIG. 12 is a flow chart illustrating a method for repetitively transmitting a PUSCH to a base station by a UE in a wireless communication system according to an embodiment. A base station of FIG. 12 may be the base station 200 of FIG. 11, and a UE of FIG. 12 may be the UE of FIG. 11. Accordingly, each operation of the UE in this embodiment may be performed by the processor 110 or the communication module 120 of the UE 100, and each operation of the base station in this embodiment may be performed by the processor 210 or the communication module 220 of the base station 200.

As noted in FIG. 12, the UE receives a radio resource control (RRC) signal from the base station (operation S1200). The RRC signal may include configuration information relating to a semi-static downlink symbol. The configuration information may designate a particular symbol as a semi-static downlink symbol.

As described above, the base station may configure the UE to repetitively transmit the PUSCH, for example, K times. When the UE is configured to repetitively transmit the PUSCH, in terms of data, data carried by the PUSCH (for example, at least one transport block (TB)) may be also repetitively transmitted. The repetitive transmission of the PUSCH described in the present disclosure does not mean retransmission of a TB by the UE due to reception failure of the base station.

For convenience of description, when a PUSCH is configured to be repetitively transmitted, the PUSCH to be repetitively transmitted is referred to as a "PUSCH repetition". In other words, when the UE is configured to repetitively transmit the PUSCH, for example, K times, the UE transmits the PUSCH including K PUSCH repetitions.

The UE determines whether at least one of a required number of symbols for transmission of respective PUSCH repetitions corresponds to a case in which PUSCH repetition may not be transmitted (operation S1210). A symbol corresponding to the case in which the PUSCH repetition may not be transmitted may be referred to as an invalid symbol for the PUSCH repetition, and in other words, the UE may determine an invalid symbol for each PUSCH repetition. In the mini-slot-level PUSCH repetition, a required number of symbols for PUSCH repetition are a predetermined number of symbols immediately after a symbol in which the previous PUSCH repetition transmission is performed.

The case in which the PUSCH repetition may not be transmitted includes, for example, a case in which at least one of the required number of symbols for PUSCH repetition transmission is a symbol designated as a semi-static downlink symbol by configuration information included in the RRC signal. In other words, the symbol indicated as a downlink symbol via the RRC signal may be considered as an invalid symbol for the PUSCH repetition. According to an aspect, the case in which the PUSCH may not be transmitted may further include a case in which at least one of the required number of symbols for the PUSCH repetition transmission is positioned before the slot boundary and at least one is positioned after the slot boundary. In addition, according to an aspect, the UE may receive, from the base station via the RRC signal, information on at least one symbol in which the PUSCH repetition may not be transmitted (operation S1200), and a case in which the PUSCH repetition may not be transmitted may include a case in which the PUSCH repetition is indicated not to be transmitted by the information on the at least one symbol, in which the PUSCH repetition may not be transmitted, the information being received from the PDCCH for scheduling the PUSCH via the RRC signal. In other words, the UE may also perform a configuration for a case in which the PUSCH repetition may not be transmitted, by a higher-layer (for example, an RRC layer) parameter.

For convenience of description, FIG. 12 illustrates in operation S1200 that the transmission via the RRC signal including configuration information of the semi-static DL symbol and/or information on a symbol in which the PUSCH repetition may not be transmitted is performed in a single stage, but a signaling time point of the configuration information of the semi-static DL symbol and the symbol in which the PUSCH repetition may not be transmitted may be identical, or the configuration information of the semi-static DL symbol and the symbol in which the PUSCH repetition may not be transmitted may be signaled at different time points, respectively.

Referring to FIG. 12, when it is determined whether at least one of a required number of symbols for each PUSCH repetition transmission corresponds to a case in which the PUSCH repetition may not be transmitted, the UE performs each PUSCH repetition transmission on the basis of the determination (operation S1220). For example, the UE may transmit the PUSCH repetition in a symbol remaining after excluding at least one symbol in which the PUSCH repetition may not be transmitted. Alternatively, the UE may transmit the PUSCH repetition in the fastest symbol among symbols in which the PUSCH repetition may be transmitted.

Figure 13:
FIG. 13 illustrates relationships among a downlink symbol, a slot boundary, and a PUSCH repetition.

FIG. 13 illustrates relationships among a downlink symbol, a slot boundary, and a PUSCH repetition. Referring to FIG. 13, for example, the UE is configured to repetitively transmit the mini-slot-level PUSCH four times, and is indicated via the PDCCH (or DCI) to transmit the PUSCH over four symbols starting from the fifth symbol in the slot. In FIG. 13, D, U, and F indicate a downlink symbol, an uplink symbol, and a flexible symbol, respectively, in the semi-static DL/UL configuration. According to an embodiment of the present disclosure, the UE may transmit the PUSCH repetition in symbol 5, symbol 6, symbol 7, and symbol 8 in the slot, and may identify whether the PUSCH repetition may be transmitted in the immediately subsequent symbols, symbol 9, symbol 10, symbol 11, and symbol 12. If the PUSCH repetition may be transmitted (that is, for example, if the symbol does not overlap the semi-static DL symbol, and the symbol does not exceed the slot boundary), the UE may transmit the PUSCH repetition in symbol 9, symbol 10, symbol 11, and symbol 12. A PUSCH starting from the next symbol, symbol 13, exceeds the slot boundary and overlaps the semi-static DL symbol, and thus the corresponding PUSCH may not be transmitted. The next transmittable symbols are symbol 3, symbol 4, symbol 5, and symbol 6 in the next slot. These symbols are flexible symbols, and may be thus transmitted. Accordingly, the third PUSCH repetition is transmitted in the corresponding symbol. The fourth PUSCH repetition is transmitted in the next symbols, symbol 7, symbol 8, symbol 9, and symbol 10. The UE has completed PUSCH repetition transmission four times, and thus the UE does not perform the repetition transmission any longer.

Figure 14:
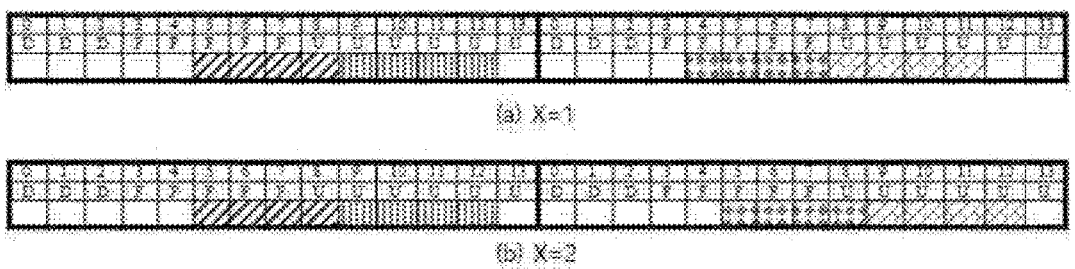
FIG. 14 illustrates relationships between a PUSCH repetition and a threshold number or less of flexible symbols subsequent to the semi-static DL symbol.

FIG. 14 illustrates relationships between a PUSCH repetition and a threshold number or less of flexible symbols subsequent to the semi-static DL symbol. According to an aspect of the present disclosure, a case in which the PUSCH repetition may not be transmitted in a predetermined number of symbols may include a case in which at least one of the required number of symbols for PUSCH repetition transmission corresponds to a threshold number or less of flexible symbols subsequent to the semi-static downlink symbol.

More specifically, according to an embodiment of the present disclosure, when the UE is configured to transmit the mini-slot-level PUSCH repetition, the UE may transmit the PUSCH repetition in a symbol immediately after a symbol in which one PUSCH repetition is transmitted. In this case, when the PUSCH fails to be transmitted (for example, when the symbol overlaps the semi-static DL symbol and the immediately subsequent X flexible symbols, or exceeds the slot boundary), the UE may transmit the PUSCH repetition in a symbol remaining after excluding the symbol in which the PUSCH repetition may not be transmitted, or may transmit the PUSCH repetition in the fastest symbol among symbols in which the PUSCH transmission may be transmitted. Here, the fastest symbol among symbols in which transmission may be performed corresponds to a case in which the PUSCH repetition does not overlap the semi-static DL symbol, does not overlap X flexible symbols immediately after the semi-static DL symbol, and does not exceed the slot boundary. Referring to FIG. 14, the UE is configured to transmit the mini-slot-level PUSCH repetition four times, and is indicated, via the PDCCH (or DCI), to transmit the PUSCH over four symbols starting from the fifth symbol in the slot. In FIG. 14, D, U, and F indicate a downlink symbol, an uplink symbol, and a flexible symbol, respectively, in the semi-static DL/UL configuration. According to an embodiment of the present disclosure, the UE may transmit the PUSCH repetition in symbol 5, symbol 6, symbol 7, and symbol 8 in the slot, and may identify whether the PUSCH repetition may be transmitted in the immediately subsequent symbols, symbol 9, symbol 10, symbol 11, and symbol 12. If the PUSCH repetition may be transmitted (that is, for example, if the symbol does not overlap the semi-static DL symbol, does not overlap X flexible symbol immediately after the semi-static DL symbol, and does not exceed the slot boundary), the UE may transmit the PUSCH repetition in symbol 9, symbol 10, symbol 11, and symbol 12. A PUSCH repetition starting from the next symbol, symbol 13, exceeds the slot boundary and overlaps the semi-static DL symbol, and thus the corresponding PUSCH repetition may not be transmitted. FIG. 14(a) illustrates a case in which X=1, and FIG. 14(b)B illustrates a case in which X=2. Referring to FIG. 14(a)A, the next transmittable symbols are symbol 4, symbol 5, symbol 6, and symbol 7 in the next slot. These symbols are flexible symbols, and may be thus transmitted. Accordingly, the third PUSCH repetition is transmitted in the corresponding symbol. The fourth PUSCH repetition is transmitted in the next symbols, symbol 8, symbol 9, symbol 10, and symbol 11. The UE has completed PUSCH repetition transmission four times, and thus the UE does not perform the repetition transmission any longer. Referring to FIG. 14B, the next transmittable symbols are symbol 5, symbol 6, symbol 7, and symbol 8 in the next slot. These symbols are flexible symbols or semi-static UL symbols, and may be thus transmitted. Accordingly, the third PUSCH repetition is transmitted in the corresponding symbol. The fourth PUSCH repetition is transmitted in the next symbols, symbol 9, symbol 10, symbol 11, and symbol 12. The UE has completed PUSCH repetition transmission four times, and thus the UE does not perform the repetition transmission any longer.

According to an aspect of the present disclosure, a case in which the PUSCH repetition may not be transmitted in a predetermined symbol may include at least one of a case in which at least one of a required number of symbols for PUSCH repetition transmission is included in a synchronization signal (SS)/physical broadcast channel (PBCH), and a case in which at least one of the symbols corresponds to a threshold number or less of flexible symbols subsequent to the SS/PBCH block.

More specifically, according to an embodiment of the present disclosure, when an SS/PBCH block is configured in a cell in which the PUSCH repetition is transmitted, or when an SS/PBCH block for measurement is configured in another cell and the measurement is to be performed, the UE may process the symbols corresponding to the SS/PBCH block in the same manner as that for semi-static DL symbol. For example, the case described in the above embodiment in which the PUSCH repetition may not be transmitted may include, in addition to the case in which the symbol overlaps the semi-static DL symbol, overlaps X flexible symbols immediately after the semi-static Dl symbol, or exceeds the slot boundary, a case in which the symbol overlaps the SS/PBCH block and overlaps X flexible symbols immediately after the symbol overlapping the SS/PBCH block.

As described above, according to an embodiment of the present disclosure, the UE which is configured to transmit the PUSCH K times may defer the PUSCH repetition until finding symbols in which the PUSCH repetition may be transmitted K times. However, deferring the PUSCH repetition for too long of a time interval does not meet the purpose for supporting the mini-slot-level PUSCH repetition. In other words, the mini-slot-level PUSCH repetition is a method for supporting an uplink URLLC service, but if the PUSCH repetition is deferred for too long of a time interval, the deferring already causes a violation against the requirements for the URLLC service. In addition, for the operation of transmitting the PUSCH repetition after deferring the PUSCH repetition for too long of a time interval, the base station wastes network resources since the corresponding resources may not be used for another UE. Accordingly, another problem to be solved by the present disclosure relates to a condition for terminating the mini-slot-level PUSCH repetition transmission.

According to an embodiment of the present disclosure, when the UE to which the mini-slot-level PUSCH repetition is configured transmits the PUSCH repetition, the transmission may be terminated in the following conditions. For example, the processor 110 of the UE 100 of FIG. 11 may be configured to control the PUSCH repetition transmission by the communication module 120, and when at least one of the following conditions is met, the processor 110 may control the PUSCH repetition to be suspended. In addition, the operation of performing PUSCH repetition transmission (operation S1220) as shown in FIG. 12 may be suspended when at least one of the following conditions is met.

Figure 15:
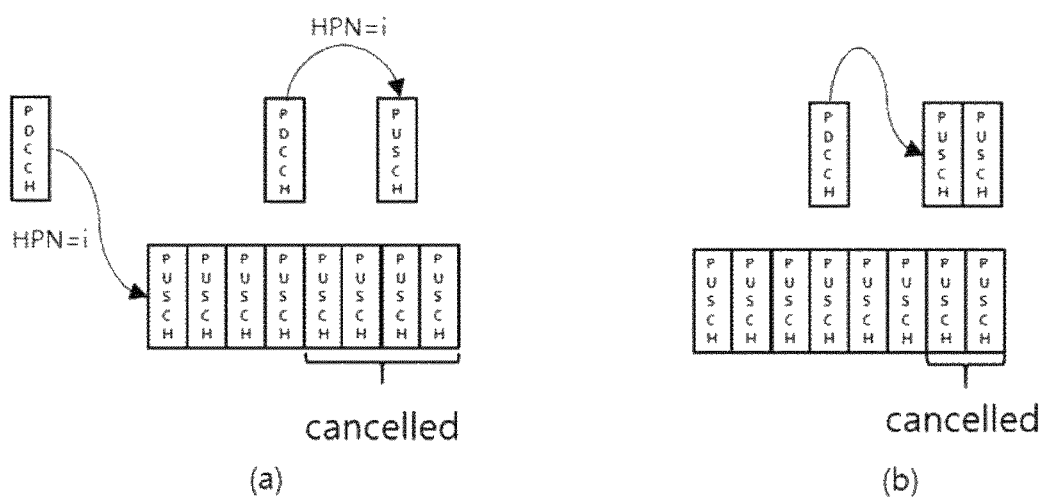
FIG. 15 illustrates a condition for terminating PUSCH repetition transmission.

FIG. 15 illustrates a condition for terminating PUSCH repetition transmission.

According to the first termination condition, the PUSCH repetition may be suspended in response to scheduling of a PUSCH having the same HARQ processor number (HPN) as that of the PUSCH repetition that is to be transmitted. That is, when a new PUSCH having the same HPN as that of the PUSCH repetition to be repetitively transmitted is scheduled, the UE may suspend the previous PUSCH repetition. More specifically, referring to FIG. 15(*a*), when the PUSCH to be repetitively transmitted is scheduled, "HPN=i" is included in scheduling information. When another PDCCH (or DCI) for scheduling the PUSCH (DCI format 0_0 or 0_1) has the same HPN (HPN=i) as the corresponding HPN, or a new data indication (NDI) is toggled on, the previous PUSCH repetition may not be transmitted after the corresponding PDCCH. Additionally, since a processing time is required to receive the PDCCH and cancel the PUSCH repetition, the PUSCH repetition before a predetermined time interval after the last symbol of the PDCCH may not be cancelled and only the PUSCH thereafter may be cancelled.

According to the second termination condition, when another PUSCH is scheduled in the same symbol as that in which the PUSCH repetition is transmitted, the UE may not transmit the PUSCH repetition. More specifically, referring to FIG. 15(*b*), the PDCCH may be scheduled to overlap the previously scheduled PUSCH in the time domain, so that the previous PUSCH repetition transmission may be terminated.

According to the third termination condition, when the UE receives an explicit HARQ-ACK for the PUSCH to be repetitively transmitted, the UE may no longer transmit the PUSCH repetition. The explicit HARQ-ACK is information informing the UE of whether the PUSCH is successfully transmitted, through a separate channel by the base station.

According to the fourth termination condition, the UE may no longer transmit the PUSCH repetition after a predetermined time interval passes. For example, if the requirements of the URLLC service of transmitting the PUSCH repetition includes termination of the transmission within 1 ms, the UE may no longer transmit the PUSCH repetition after 1 ms. Here, the predetermined time interval may be configured to be an absolute time such as 1 ms, or may be configured in units of slots, such as two slots. The predetermined time interval is a value which may be configured by the base station.

Figure 16:
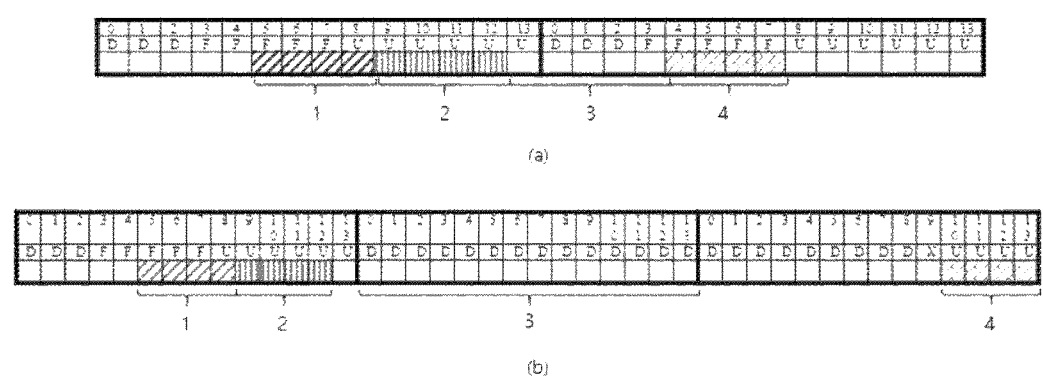
FIG. 16 illustrates a method for counting the number of PUSCH repetitions.

FIG. 16 illustrates a method for counting the number of PUSCH repetitions. An embodiment of the present disclosure relates to a method for counting the number of PUSCH repetitions repetitively transmitted K times by a UE configured to repetitively transmit the PUSCH K times. In the description above, the number of PUSCH repetitions to be transmitted increases only when the UE actually transmits the PUSCH repetition. However, as described above, a PUSCH delay may occur for too long of a time interval to transmit the PUSCH K times. To solve the problem, according to an embodiment of the present disclosure, the following counting rules are described.

The first counting rule is as follows. The repetition number is counted when the UE actually transmits the PUSCH repetition. In addition, the repetition number is counted when the PUSCH repetition fails to be transmitted for Y symbols. If the counted number of PUSCH repetitions exceeds K, the UE does not transmit the PUSCH repetition any longer. Here, Y may correspond to the number of symbols allocated for the PUSCH repetition. In another example, Y may correspond to the number of symbols included in one slot. In another example, Y may correspond to a value configured via a higher-layer. FIG. 16(*a*) illustrates the PUSCH repetition number obtained according to the first counting rule. Here, the number of PUSCH repetitions is configured to be K (K=4). In addition, it is assumed that Y=5. The UE does not transmit the PUSCH repetition in the last symbol in the first slot and the first four symbols in the second slot, but the repetition number is to be counted because the transmission has failed during Y (Y=5) symbols. In addition, the last fourth PUSCH repetition may be transmitted in symbols 4, 5, 6, and 7 in the second slot.

The second counting rule is as follows. The repetition number is counted when the UE actually transmits the PUSCH repetition. In addition, the repetition number is counted when the PUSCH repetition has been not transmitted even once in a Z slot. If the counted number of PUSCH repetitions exceeds K, the UE does not transmit the PUSCH repetition any longer. Here, the Z slot may correspond to one slot. In another example, Z may correspond to a value configured via a higher-layer. FIG. 16(*b*) illustrates the PUSCH repetition number obtained according to the second counting rule. Here, the number of PUSCH repetitions is configured to be K (K=4). In addition, it is assumed that Z=1. The UE does not transmit the PUSCH repetition in the second slot, but the repetition number is to be counted because the transmission has failed during a Z (Z=1) slot. In addition, the last fourth PUSCH repetition may be transmitted in symbols 10, 11, 12, and 13 in the third slot.

Referring to the standard document 3GPP TS38.213, the PUSCH for transmitting uplink data by the UE may not exceed the slot boundary. That is, the start symbol and the last symbol of the scheduled PUSCH should be always positioned within the same slot. (In the case of the PUSCH repetition, the start symbol and the last symbol may be positioned in different slots, but here, a normal PUSCH transmission case excluding the case of the repetition transmission is described.) More specifically, the base station informs the UE of information on symbols in which a PUSCH may be transmitted, through a starting and length indication value (SLIV). The SLIV may indicate the position of the start symbol (here, indicated as "S" and having a value among 0, 1, 2, . . . , and, 13) and the length (here, indicated as "L" and having a value among 1, 2, . . . , and 14) in the slot. The SLIV has a value among values of S+L (S+L=1, 2, . . . , and 14). When using a combination of values satisfying S+L>14, the start symbol and the last symbol may not be positioned in the same slot. For example, if S=5 and L=10, then the start symbol is the sixth symbol in the slot and the length corresponds to the length of 10 symbols, and thus one symbol is positioned in the first symbol in the next slot. Accordingly, the start symbol and the last symbol are positioned in different slots, respectively. Referring to 3GPP TS38.213, the SLIV may be obtained according to Equation 1 below.

if $(L-1) \leq 7$ then $SLIV=14 \cdot (L-1)+S$ else $SLIV=14 \cdot (14-L+1)+(14-1-S)$ where $0 < L \leq 14-S$, and [Equation 1]

To provide a URLLC service, the base station should allocate a resource to the UE so that PUSCH transmission may start as promptly as possible. In addition, for sufficient reliability, a sufficient number of symbols need to be used. However, as described above, since the PUSCH may not be scheduled exceeding the slot boundary, the PUSCH repetition transmission should be scheduled in the next slot when there are not a sufficient number of symbols to be used for uplink transmission in the current slot. This scheme is not suitable for the URLLC service since latency occurs until the transmission is performed in the next slot. A scheme required to solve the problem is to use an SLIV allowing scheduling exceeding the slot boundary. The scheme is referred as a "multi-segment transmission" scheme. According to an aspect of the present disclosure, an SLIV designing method which allows scheduling exceeding the slot boundary is disclosed.

When the UE receives scheduling information which requires scheduling exceeding the slot boundary (that is, S+L>14), through the SLIV, the UE may not transmit the PUSCH exceeding the slot boundary. Accordingly, with reference to the slot boundary, the first PUSCH repetition is transmitted in symbols corresponding to the preceding slot, and the second PUSCH repetition may be transmitted in symbols corresponding to the subsequent slot. More specifically, the first PUSCH repetition is transmitted in symbol S to symbol 13 (the last symbol) having the length of L1 (L1=13−S+1) in the preceding slot, and the second PUSCH repetition is transmitted in symbol 0 to symbol L2−1 having the length of L2 in the subsequent slot. Here, L2=L−L1. The transmission of the first PUSCH repetition and the second PUSCH repetition may be the same transport block (TB) repetition transmission. If the symbols above correspond to symbols which may not be transmitted via the uplink, the UE may transmit the first PUSCH repetition and the second PUSCH repetition in symbols remaining after excluding the corresponding symbols. Here, the symbols which may not be transmitted via the uplink may be DL symbols determined according to the semi-static DL/UL assignment, P flexible symbols immediately after the DL symbols determined according to the semi-static DL/UL assignment, symbols corresponding to the SS/PBCH block, and P flexible symbols immediately after the symbols corresponding to the SS/PBCH block. Here, for example, P may have a value of 1 or 2.

Figure 17:
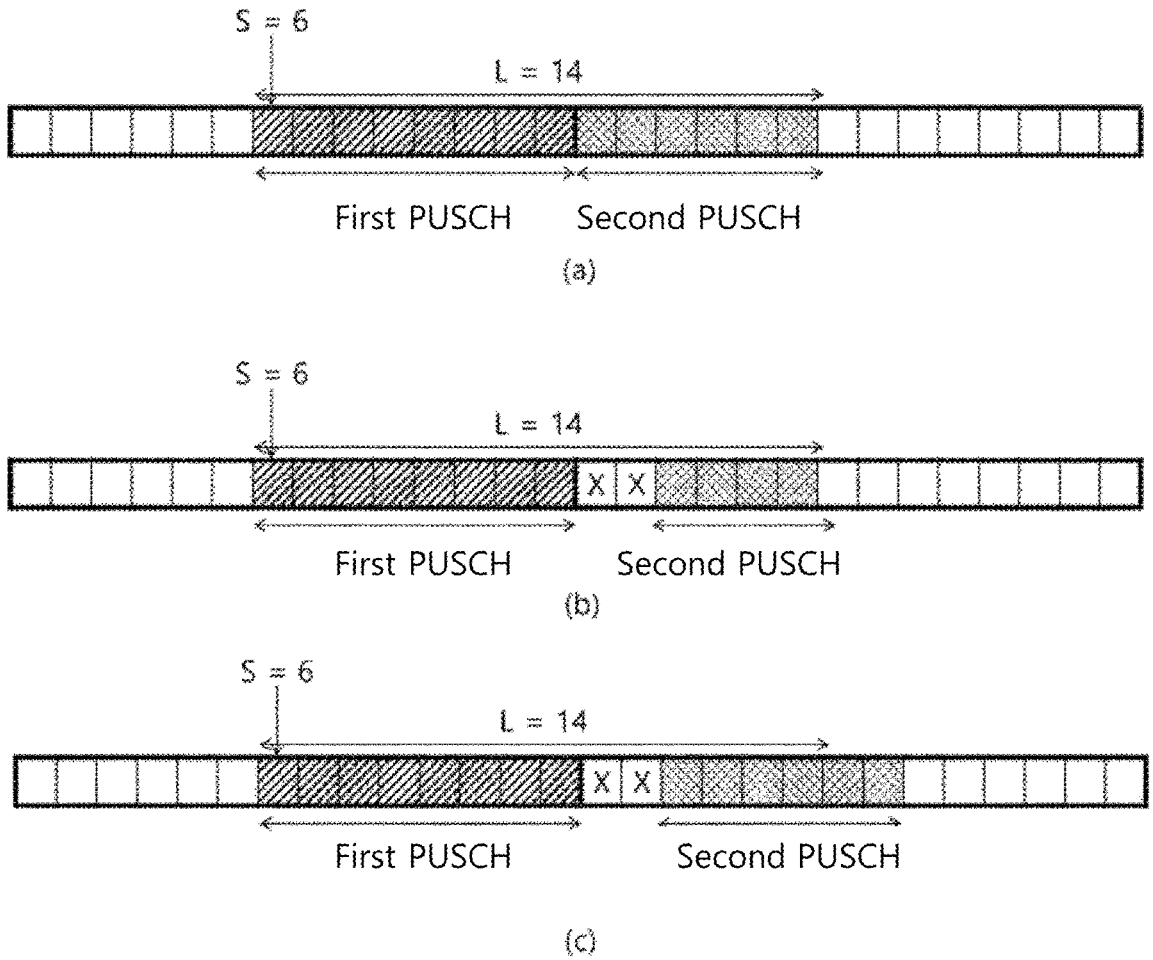
FIG. 17 illustrates PUSCH transmission exceeding the slot boundary.

FIG. 17 illustrates PUSCH transmission exceeding the slot boundary. Referring to FIG. 17(a), when a PUSCH, the start symbol (S) of which is symbol 6, and the length of which is 14, is scheduled, the first PUSCH repetition may be transmitted in symbol 6 to symbol 13 having the length of 8 in the first slot, and the second PUSCH repetition may be transmitted in symbol 0 to symbol 5 having the length of 6 in the second slot. Referring to FIG. 17(b), when the first two symbols in the second slot may not be transmitted via the uplink, the UE may not transmit the PUSCH repetition in the two symbols. Accordingly, the second PUSCH repetition may be transmitted in four symbols starting from the third symbol in the second slot.

According to the scheme above, when there is a symbol which may not be used for uplink transmission, the length of the PUSCH is reduced. To prevent the reduction, in a case of overlapping of the symbol in which the uplink transmission is not allowed, transmission is postponed and performed in symbols in which the uplink transmission is allowed after the symbol in which the uplink transmission is not allowed. For example, referring to FIG. 17(c), when the first two symbols in the second slot correspond to symbols which may not be transmitted via the uplink, the UE may transmit the second PUSCH repetition in six symbols in which the uplink transmission is allowed after the corresponding two symbols. Accordingly, even though the PUSCH repetition is postponed, the number of symbols allocated for the PUSCH repetition may be maintained, and thus deterioration of the reception performance of the PUSCH may be prevented.

According to an aspect of the present disclosure, an SLIV designing method is as follows.

According to an embodiment of the present disclosure, the SLIV may be designed to satisfy the following condition. The start symbol position (S) may have a value among 0, 1, . . . , and 13, and the entire PUSCH length (L) may have a value among 1, 2, . . . , and 14. Here, the value of S+L may be a value from 1 to 27 without any separate restrictions. An equation for obtaining the SLIV satisfying the condition is as follows.

SLIV=S+14*(L−1) or
SLIV=L−1+14*S

When SLIV=S+14*(L−1) is used as an equation for obtaining the SLIV, S may be obtained by a remainder after dividing the SLIV by 14 (S=SLIV mod 14), and L may be obtained by adding 1 to a quotient obtained by dividing the SLIV by 14 (L=floor(SLIV/14)+1). In addition, when SLIV=L−1+14*S is used as an equation for obtaining the SLIV, L may be obtained by adding 1 to a quotient obtained by dividing the SLIV by 14 (L=(SLIV mod 14)+1), and S may be obtained by a quotient obtained by dividing the SLIV by 14 (S=floor(SLIV/14)).

If determining the SLIV according to the scheme above, the UE may perform scheduling exceeding the boundary of one slot. However, when scheduling is performed according to the scheme above, the scheduling may not be performed including the last symbol of the second slot (here, with reference to the slot boundary, the preceding slot is called the first slot, and the subsequent slot is called the second slot). Even though there are available symbols in the second slot, only a few symbols are used, whereby it is inefficient in terms of the frequency use efficiency. An embodiment of the present disclosure to solve the problem above is as follows.

The start symbol position (S) may have a value among 0, 1, . . . , and 13, and the entire PUSCH length (L) may have a value among 1, 2, . . . , and 28. Here, the value of S+L should be equal to or smaller than 28. In this case, L may be 28 (L=28), but the PUSCH transmitted according to the SLIV is divided with reference to the slot boundary, and thus the length of one PUSCH repetition is equal to or smaller than 14. An equation for obtaining the SLIV satisfying the condition above is as follow.

If $(L-1) \leq 7+14$ then $SLIV=14*(L-1)+S$ else $SLIV=14*14+14(2-L+1)+(14-1-S)$ where $0<L\leq 28-S$ In general, the start symbol position (S) may have a value among 0, 1, . . . , and B, and the entire PUSCH length (L) may have a value among 1, 2, . . . , and A. Here, the value of S+L should be equal to or smaller than A. An equation for obtaining the SLIV satisfying the condition above is as follow.

If $(L-1)-\text{floor}((A-(B+1))/2) \leq \text{floor}(A/2)$ then $SLIV=(B+1)*(L-1)+S$ else $SLIV=(B+1)*(A-L+A-B)+(B-S)$ where $0<L\leq A-S$ A case in which A=14 and B=13 is the same as the case in Equation 1, and a case in which A=28 and B=13 is the same as that in the previous embodiment. A may be determined to be a multiple of the number of symbols included in one slot. For example, when the number of symbols included in one slot is 14, A may be determined to be a value of 14, 28, 42, or the like. B may be determined to be a value obtained by subtracting 1 from the number of symbols included in one symbol. For example, when the number of symbols included in one slot is 14, B may be determined to be a value of 13, 27, 41, or the like.

According to another embodiment of the present disclosure, an SLIV allowing exceeding of the slot boundary may be obtained by multiplying the length value among the SLIV in the existing Equation 1 by an integer. The start symbol position (S) may have a value among 0, 1, . . . , and 13, and the entire PUSCH length (L) may have a value among 2, 4, 6, . . . , and 28. Here, the value of S+L should be equal to or smaller than 28. An equation for obtaining the SLIV satisfying the condition above is as follow. Here, L may be obtained according to L=2*X, wherein X may have a value among 1, 2, 3, . . . , and 14. According this scheme, the length value obtained according to Equation 1 doubles, and thus scheduling exceeding the slot boundary is allowed. In general, L may be obtained according to L=A*X, wherein A may be determined to have a value among natural numbers equal to or larger than 2.

If$(X-1) \leq 7$ then $SLIV=14*(X-1)+S$ else $SLIV=14*(14-X+1)+(14-1S)$ where $0<X\leq 14-S$ The scheme above has an SLIV interpretation scheme similar to that of Equation 1, and is also superior in terms of the overhead since the SLIV is represented by the same number of bits.

According to another embodiment of the present disclosure, according to Equation 1, a value that the SLIV may have is 105 (14*15/2) in total including 0, 1, . . . , and 104. This may be represented by seven bits. 0, 1, . . . , and 127 may be represented by seven bits, and thus a total of 23 values including 105, 106, . . . , and 127 are not used. According to an embodiment of the present disclosure, the base station may perform scheduling exceeding the slot boundary by using those 23 values (SLIV=105 to 127). More specifically, when the SLIV has a value among 105, 106, . . . , and 127, each of the start symbol position (S) and the length (L) may have a predetermined value. For example, when SLIV=105, S and L may be determined, such as S=7 and L=14.

By combining the mini-slot-level PUSCH repetition transmission scheme and multi-segment transmission scheme, a PUSCH repetition transmission scheme according to another embodiment is described.

Figure 18:
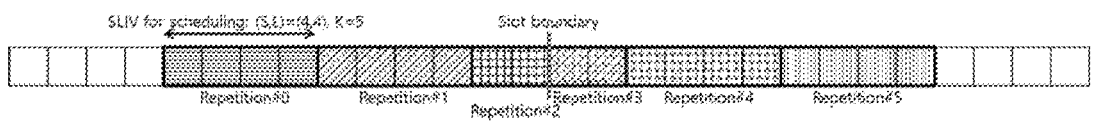
FIG. 18 illustrates the first PUSCH transmission method according to an aspect of the present disclosure.

FIG. 18 illustrates the first PUSCH transmission method according to an aspect of the present disclosure. The first PUSCH transmission method is as follows. Referring to FIG. 18, the base station transmits time domain resource allocation information (S: the start symbol, L: the length) of the first PUSCH repetition of the PUSCH to the UE. The repetition number (K) is transmitted. The UE determines a symbol in which the PUSCH repetition is transmitted by using the transferred information. Here, the subsequent PUSCH repetition is transmitted consecutively in a symbol immediately after the first PUSCH repetition. When one PUSCH repetition exceeds the slot boundary, the corresponding PUSCH repetition may be divided with reference to the slot boundary. In addition, when one PUSCH repetition overlaps a DL symbol or an SS/PBCH block configured in the semi-static UL/DL configuration, the PUSCH repetition may be transmitted in a symbol not overlapping the DL symbol. Additionally, the UE may exclude a flexible symbol immediately after the DL symbol configured in the semi-static UL/DL configuration for a PUSCH repetition. Referring to FIG. 18, when 4 is given as the start symbol index of the first PUSCH repetition, 4 is given as the length, and 5 is given as the repetition number, the third PUSCH repetition exceeds the slot boundary, and thus the PUSCH repetition is divided with reference to the slot boundary. In this scheme, a disadvantage in that one PUSCH repetition has too few symbols may be caused when the PUSCH repetition is divided with reference to the slot boundary. According to an embodiment of the present disclosure to solve the problem, when a PUSCH repetition is configured with only one symbol, the UE may not transmit the corresponding PUSCH repetition. This is because data other than the DM-RS may not be transmitted in the corresponding symbol when the PUSCH repetition is configured with only one symbol. Furthermore, when the number of DM-RS symbols to be transmitted by the PUSCH repetition is equal or smaller than the number of symbols for the PUSCH repetition transmission, the UE may not transmit the corresponding PUSCH repetition.

Figure 19:
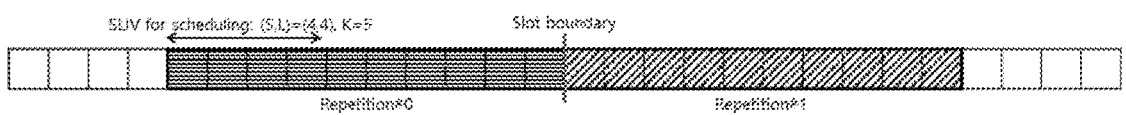
FIG. 19 illustrates the second PUSCH transmission method according to an aspect of the present disclosure.

FIG. 19 illustrates the second PUSCH transmission method according to an aspect of the present disclosure. The second PUSCH transmission method is as follows. Referring to FIG. 19, the base station transmits time domain resource allocation information (S: the start symbol, L: the length) of the PUSCH to the UE. The repetition number (K) is transmitted. The base station identifies whether L*K symbols from the start symbol exceed the slot boundary. When there is no symbol exceeding the slot boundary, the first PUSCH repetition is configured with L symbols from the start symbol, and the subsequent K−1 PUSCH repetitions may consecutively start from a symbol immediately after the first PUSCH repetition, and may occupy L symbols. When there are symbols exceeding the slot boundary, the UE may divide the PUSCH repetition into several parts by dividing L*K symbols with reference to the slot boundary. Referring to FIG. 19, when 4 is given as the start symbol index of the first PUSCH repetition, 4 is given as the length, and 5 is given as the repetition number, 20 symbols starting from the start symbol index 4 exceed the slot boundary, and thus the UE may divide those 20 symbols with reference to the slot boundary. Accordingly, two PUSCH repetitions may be transmitted in FIG. 19.

Figure 20:
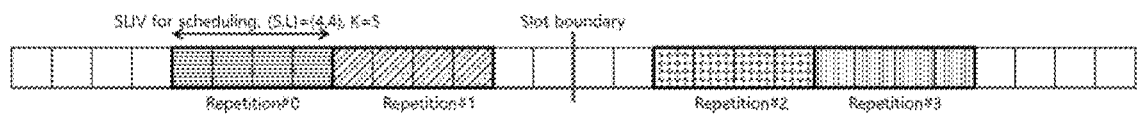
FIG. 20 illustrates the third PUSCH transmission method according to an aspect of the present disclosure.

FIG. 20 illustrates the third PUSCH transmission method according to an aspect of the present disclosure. The third PUSCH transmission method is as follows. Referring to FIG. 20, the base station transmits time domain resource allocation information (S: the start symbol, L: the length) of the first PUSCH repetition of the PUSCH to the UE. The repetition number (K) is transmitted. The UE determines a symbol in which the PUSCH repetition is transmitted by using the transferred information. Here, the subsequent PUSCH repetition is transmitted consecutively in a symbol immediately after the first PUSCH repetition. When one PUSCH repetition exceeds the slot boundary, the UE does not transmit the corresponding PUSCH repetition. Additionally, when one PUSCH repetition overlaps a DL symbol or an SS/PBCH block configured in the semi-static UL/DL configuration, the UE does not transmit the corresponding PUSCH repetition. In FIG. 20, the third PUSCH repetition overlaps the slot boundary and is thus not transmitted.

Figure 21:
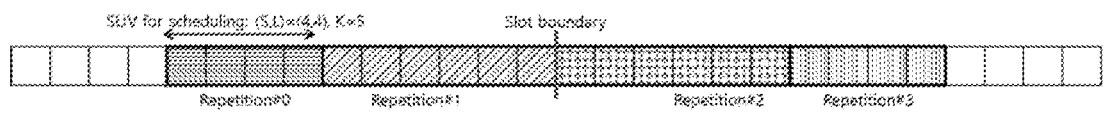
FIG. 21 illustrates the fourth PUSCH transmission method according to an aspect of the present disclosure.

FIG. 21 illustrates the fourth PUSCH transmission method according to an aspect of the present disclosure. The fourth PUSCH transmission method is as follows. Referring to FIG. 21, the base station transmits time domain resource allocation information (S: the start symbol, L: the length) of the first PUSCH repetition of the PUSCH to the UE. The repetition number (K) is transmitted. The UE determines a symbol in which the PUSCH repetition is transmitted by using the transferred information. Here, the subsequent PUSCH repetition is transmitted consecutively in a symbol immediately after the first PUSCH repetition. When one PUSCH repetition exceeds the slot boundary, the UE divides symbols allocated to the corresponding PUSCH repetition with reference to the slot boundary, and includes the divided symbols in the adjacent PUSCH repetition in the same slot. When there is no adjacent PUSCH repetition in the same slot, the UE may transmit the PUSCH repetition in the corresponding symbols. In FIG. 21, symbols allocated to the third PUSCH repetition exceed the slot boundary. The symbols are divided into two symbol groups, wherein the first two symbols are included in the previous PUSCH repetition and the second two symbols are included in the subsequent PUSCH repetition.

Figure 22:
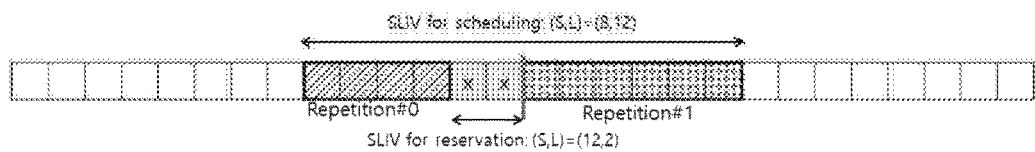
FIG. 22 illustrates an embodiment of transmission of information on a symbol in which a PUSCH repetition cannot be transmitted.

FIG. 22 illustrates an embodiment of transmission of information on a symbol in which a PUSCH repetition may not be transmitted. Referring to FIG. 22, the base station may additionally transmit information on a symbol in which the PUSCH repetition may not be transmitted. The UE may transmit the PUSCH repetition by using the first to fourth transmission methods above, wherein when symbols, in which the PUSCH repetition may not be transmitted, designated by the information transmitted by the base station, overlap a symbol to which the corresponding PUSCH repetition is allocated, symbols in which the PUSCH repetition may not be transmitted may be excluded from the corresponding PUSCH repetition. Alternatively, when symbols in which the PUSCH repetition may not be transmitted overlap a symbol to which the corresponding PUSCH repetition is allocated, the UE may not transmit the corresponding PUSCH repetition. The information on the symbol in which the PUSCH repetition may not be transmitted may be configured for the UE via the RRC signal. In addition, a symbol in which the PUSCH repetition may not be transmitted is configured for the UE via the RRC signal, and a symbol in which the PUSCH repetition may not be actually transmitted, among the configured symbols in which the PUSCH repetition may not be transmitted, may be indicated via DCI. In addition, when the base station configures a time domain resource assignment (TDRA) table for the UE, different symbols in which the PUSCH repetition may not be transmitted may be configured for entries of the table. One entry of the TDRA table configured via the DCI is indicated to the UE, and the PUSCH repetition may be transmitted according to the symbol, in which the PUSCH repetition may not be transmitted, configured for each entry.

Another problem to be solved by the present disclosure relates to a method for obtaining a transport block (TB) size during PUSCH repetition transmission. According to TS38.214, the TB size may be proportional to the RE number of the resource to which the PUSCH is allocated. That is, the PUSCH to which more REs are allocated may have a larger TB size. However, as described in the previous embodiment relating to the PUSCH repetition, there may be different numbers of REs that respective PUSCH repetitions may occupy. For example, the first PUSCH repetition may occupy two symbols, and the second PUSCH repetition may occupy 10 symbols. In this case, a reference RE number for determining the TB size is required.

According to an embodiment of the present disclosure, the TB size may be determined so as to make the first PUSCH decodable. The reason for using the PUSCH repetition is to reduce the latency by the success in prompt decoding. Accordingly, it is important for the decodable PUSCH to be transmitted. For this purpose, the UE may determine the TB size according to the RE number of the first PUSCH. In general, the UE may determine the TB size with reference to the minimum RE value corresponding to the PUSCH repetition having the redundancy version (RV) value of 0. However, when the TB size is always determined with reference to the RE number of the first PUSCH, there is a problem in that the optimal TB size may not be determined since the number of REs occupied by another PUSCH is not considered. For example, in a case in which the number of REs occupied by the first PUSCH is greater than the number of REs occupied by the second PUSCH, when the TB size is determined with reference to the number of REs occupied by the first PUSCH, a code rate may increase since there is a smaller number of REs occupied by the second PUSCH, whereby the performance deterioration may occur.

According to an embodiment of the present disclosure for solving the problem, if the RE number of the first PUSCH repetition is smaller than an average of all repetition RE numbers (that is, a value obtained by dividing all PUSCH repetition RE numbers by the repetition number), the TB size may be determined according to the first PUSCH repetition RE number, and otherwise, the TB size may be determined according to the average of all repetition RE numbers. According to an embodiment of the present disclosure for solving the problem, if the TB size according to the first PUSCH repetition RE number is smaller than an average of TB sizes according to all repetition RE numbers (that is, a value obtained by dividing a sum of TB sizes according to respective PUSCH RE numbers by the repetition number), the TB size may be determined according to the first PUSCH repetition RE number, and otherwise, the TB size may be determined according to the average of TB sizes according to all repetition RE numbers.

PUSCH Repetition Transmission and UCI Piggyback

Another illustrative problem to be solved by the present disclosure is related to PUSCH repetition transmission and UCI piggybacking (or UCI multiplexing).

Figure 23:
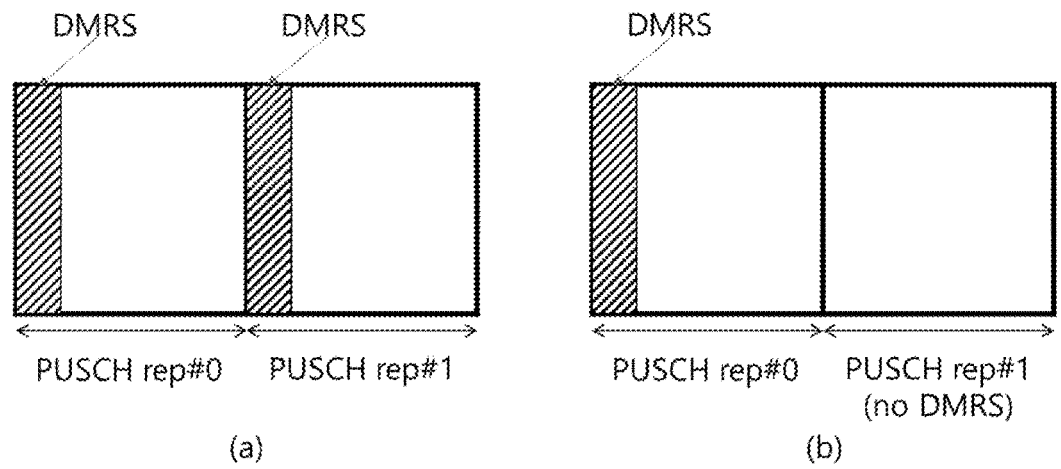
FIG. 23 illustrates PUSCH repetition transmission for coverage extension and prompt decoding of a PUSCH.

FIG. 23 illustrates PUSCH repetition transmission for coverage extension and prompt decoding of a PUSCH. Referring to FIG. 23, when transmitting the PUSCH, the UE may repetitively transmit the PUSCH for coverage extension and prompt decoding of the PUSCH. More specifically, for PUSCH repetition transmission, the number of PUSCH repetitions may be configured for or indicated to the UE by the base station. When the UE has received DCI for scheduling the PUSCH transmission, the DCI may indicate the time-frequency area occupied by the first PUSCH repetition of the PUSCHs to be repetitively transmitted. The UE may repetitively transmit the PUSCH according to a repetition number after the first PUSCH repetition indicated by the DCI. Referring to FIG. 23(a), the UE may be configured and indicated to repetitively transmit the PUSCH twice, and the UE may transmit the first PUSCH repetition (PUSCH rep #0) according to time-frequency resource allocation information indicated via the DCI. In addition, the second PUSCH repetition (PUSCH rep #1) may be transmitted after the first PUSCH repetition (PUSCH rep #0). The DM-RS for channel estimation may be included in each PUSCH repetition and transmitted. FIG. 23(a) shows an example of transmitting the DM-RS in the first symbol for each PUSCH repetition. The position of the symbol in which the DM-RS may be transmitted may be configured by the base station. In the present disclosure, for convenience of description, it is described under an assumption that the DM-RS is configured to be positioned in the first symbol of the PUSCH repetition, but the idea of the present disclosure may be applied in the same manner to a case in which DM-RSs are configured to be positioned in different positions.

Referring to FIG. 23(b), when repetitively transmitting the PUSCH, the UE may transmit the PUSCH repetition by omitting the DM-RS from the PUSCH repetition. Data to be transmitted via the uplink (that is, UL-SCH) may be rate-matched to a resource from which the DM-RS is omitted and may be transmitted. In the case of omitting the DM-RS, the base station may perform channel estimation by using the DM-RS of another PUSCH repetition, and may receive data transmitted via the uplink by using the value. By not transmitting the DM-RS, more resources may be used for data to be transmitted via the uplink (UL-SCH), and thus the probability of successfully transmitting the PUSCH may be increased.

According to an embodiment of the present disclosure, when the UE repetitively transmits the PUSCH, whether the PUSCH repetition includes the DM-RS may be determined as follows.

Figure 31:
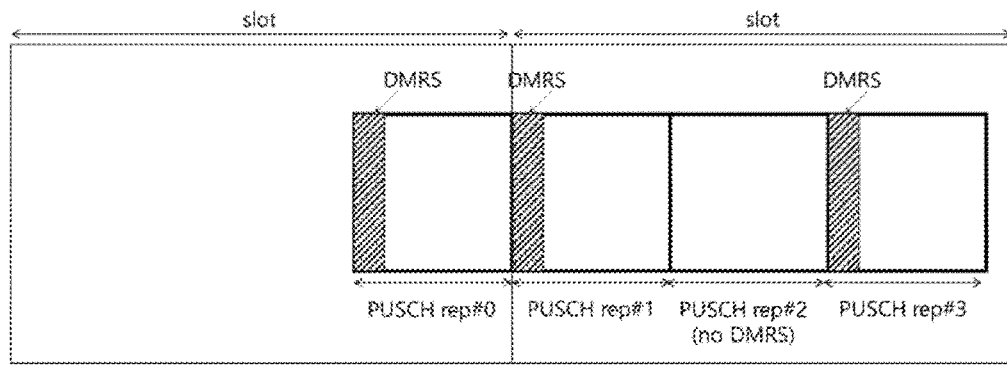
FIG. 31 illustrates a case in which a PUSCH repetition is repetitively transmitted exceeding the slot boundary.

According to the first method, the base station may configure, for the UE, the PUSCH repetition period (number) by which the DM-RS is included. More specifically, the base station may configure the UE to include the DM-RS every X PUSCH repetitions. In this case, the first PUSCH repetition in each slot may always include the DM-RS, and the DM-RS may be included in every X PUSCH repetitions from the first PUSCH repetition in the slot. If X=2, the UE may include the DM-RS in the first PUSCH repetition in the slot and may omit the DM-RS from the second PUSCH. The UE may include the DM-RS in the third PUSCH and may omit the DM-RS from the fourth PUSCH repetition. If X=3, the UE may include the DM-RS in the first PUSCH repetition, and may omit the DM-RS from the second PUSCH repetition and the third PUSCH repetition. The UE may include the DM-RS in the fourth PUSCH repetition, and may omit the DM-RS from the fifth PUSCH repetition and the sixth repetition. FIG. 31 illustrates a case in which the PUSCH repetition is repetitively transmitted exceeding the slot boundary. Since the first PUSCH repetition in each slot should always include the DM-RS, each of the first PUSCH repetition (PUSCH rep #0) and the second PUSCH repetition (PUSCH rep #1) includes the DM-RS. If X=2 is applied from the second PUSCH repetition, the DM-RS may be omitted from the third PUSCH repetition, and the DM-RS may be included in the fourth PUSCH repetition.

The disadvantage which may be caused by the first method is that the length of the PUSCH is not considered. In the first method, when the length of the PUSCH changes, a space between DM-RS symbols changes. The DM-RS space required for the channel estimation is actually determined according to the channel environment, and thus the first method is not desirable. The second method for solving the problem in the first method is to configure, for the UE by the base station, symbol number Y as a space between DM-RS symbols. The UE may arrange DM-RSs every Y symbol spaces. More specifically, when Y is configured, whether the PUSCH repetition includes the DM-RS may be determined as follows. First, the first PUSCH repetition in the slot should always include the DM-RS. When the space between the DM-RS symbol of the second PUSCH repetition and the DM-RS symbol of the first PUSCH repetition is smaller than Y symbols, the UE may omit the DM-RS from the second PUSCH repetition. On the other hand, when the space between the DM-RS symbol of the second PUSCH repetition and the DM-RS symbol of the first PUSCH repetition is equal to or larger than Y symbols, the UE may include the DM-RS in the second PUSCH repetition. In order to determine whether to include the DM-RS of the n-th PUSCH repetition, when the space between the closest preceding DM-RS symbol and the DM-RS symbol of the n-th PUSCH repetition is smaller than Y symbols, the UE may omit the DM-RS from the n-th PUSCH repetition. On the other hand, when the space between the closest preceding DM-RS symbol and the DM-RS symbol of the n-th PUSCH repetition is equal to or larger than Y symbols, the UE may include the DM-RS in the n-th PUSCH repetition. According to another scheme, PUSCH repetitions which are not partially included in but completely included in Y symbols from the DM-RS may omit the DM-RS symbol. Alternatively, when the PUSCH repetition is partially included or not included at all within Y symbols from the DM-RS, the corresponding PUSCH repetition may always include the DM-RS.

Figure 24:
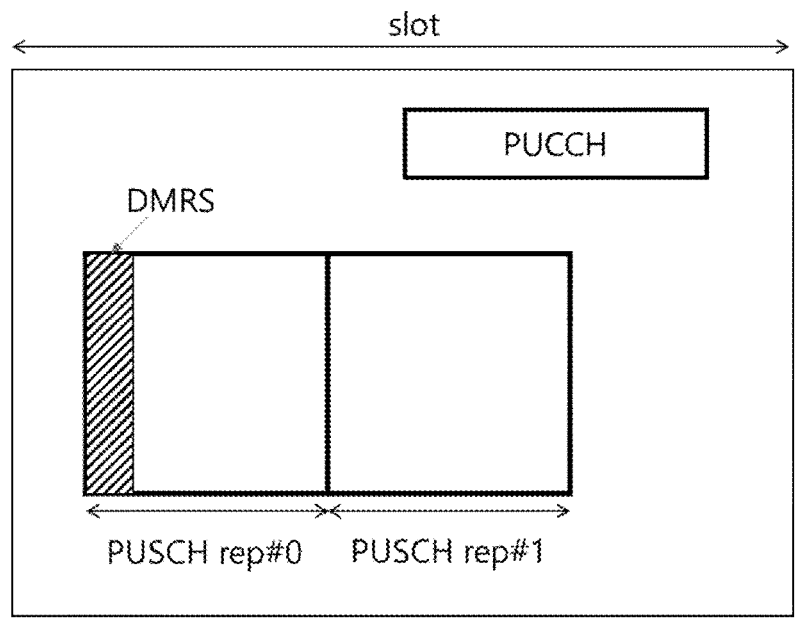
FIG. 24 illustrates multiplexing or piggybacking in a configuration in which a PUSCH repetition from which a DM-RS is omitted and another PUCCH are transmitted in the same symbol.

FIG. 24 illustrates multiplexing or piggybacking in a configuration in which a PUSCH repetition from which a DM-RS is omitted and another PUCCH are transmitted in the same symbol. Referring to FIG. 24, a problem to be solved by the present disclosure relates to a method for multiplexing (or piggybacking) uplink control information (UCI) included in a PUCCH and transmitting the same when a UE is configured or indicated so that a PUSCH repetition from which a DM-RS is omitted and another PUCCH are transmitted in the same symbol. Referring to the standard document 3GPP TS38.213, when the UE is configured and indicated so that the PUSCH and the PUCCH are transmitted in the same symbol, UCI included in the PUCCH may be multiplexed (or piggybacked), wherein the time-frequency resource to which the UCI is mapped may be positioned in a symbol immediately after the DM-RS of the PUSCH. Since the UCI is disposed in the symbol immediately after the DM-RS, the reliability of the UCI (that is, the probability of successfully transmitting the UCI) may be increased. In addition, when there are two or more PUSCHs overlapping one PUCCH, the UE may perform multiplexing (or piggybacking) of UCI included in the PUCCH for each of the overlapping PUSCH repetitions. However, a time-frequency resource to be used to transmit the UCI included in the PUCCH by the UE in a case in which the PUSCH repetition transmitted by the UE does not include the DM-RS symbol has not been determined. In the present disclosure, a method for determining a symbol for transmitting UCI to be multiplexed (or piggybacked) is suggested.

Figure 25:
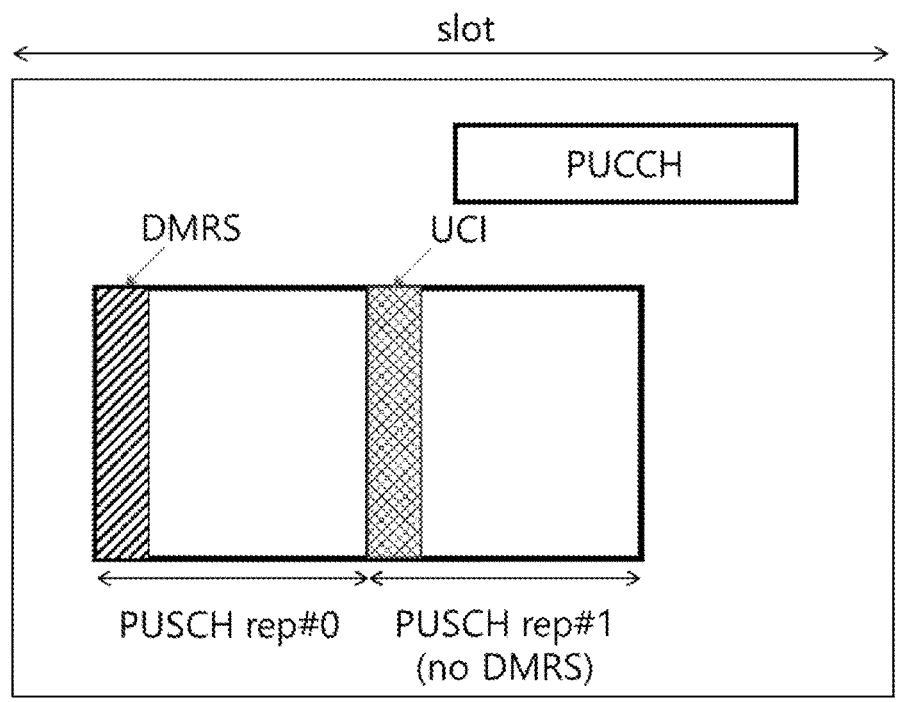
FIG. 25 illustrates UCI transmission in a configuration in which a PUSCH repetition from which a DM-RS is omitted and another PUCCH are transmitted in the same symbol.

FIG. 25 illustrates UCI transmission in a configuration in which a PUSCH repetition from which a DM-RS is omitted and another PUCCH are transmitted in the same symbol. According to an embodiment of the present disclosure, referring to FIG. 25, when the UE is configured and indicated so that a PUSCH repetition from which a DM-RS is omitted and another PUCCH are transmitted in the same symbol, UCI included in the PUCCH may be transmitted starting from a designated symbol in the PUSCH repetition from which the DM-RS is omitted. The position of the designated symbol may be the first symbol in the PUSCH repetition. The position of the designated symbol may be the last symbol in the PUSCH repetition. FIG. 25 shows that a symbol to which the UCI is mapped is in the first symbol in the second PUSCH repetition (PUSCH rep #1).

Figure 26:
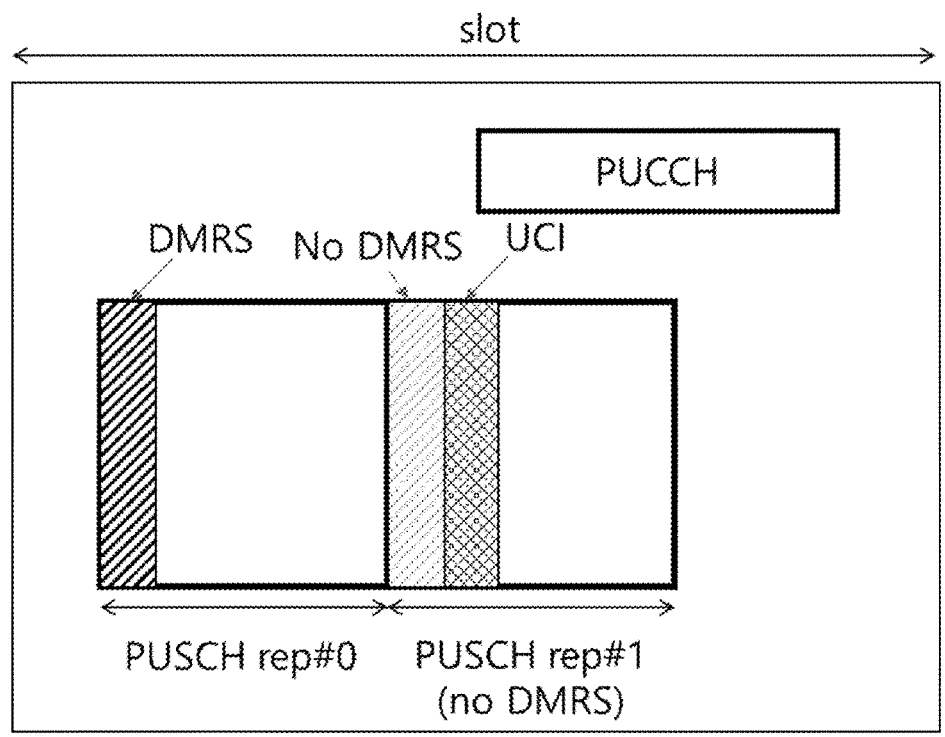
FIG. 26 illustrates UCI transmission under the assumption that an omitted DM-RS has been omitted in a configuration in which a PUSCH repetition from which a DM-RS is omitted and another PUCCH are transmitted in the same symbol.

FIG. 26 illustrates UCI transmission under the assumption that an omitted DM-RS has not been omitted in a configuration in which a PUSCH repetition from which a DM-RS is omitted and another PUCCH are transmitted in the same symbol. According to another embodiment of the present disclosure, referring to FIG. 26, when the UE is configured and indicated so that a PUSCH repetition from which a DM-RS is omitted and another PUCCH are transmitted in the same symbol, the DM-RS is omitted from the PUSCH repetition and does not exist, but the UE may assume that the DM-RS exists and may map the UCI in a symbol immediately after the corresponding DM-RS to transmit the same. This scheme is advantageous in that UCI mapping between the PUSCH repetition including the DM-RS and the PUSCH repetition without the DM-RS may remain the same. FIG. 26 shows that the UCI may be transmitted in a symbol immediately after the symbol to be occupied by the DM-RS if the DM-RS is transmitted in the second PUSCH repetition (PUSCH rep #1).

Figure 27:
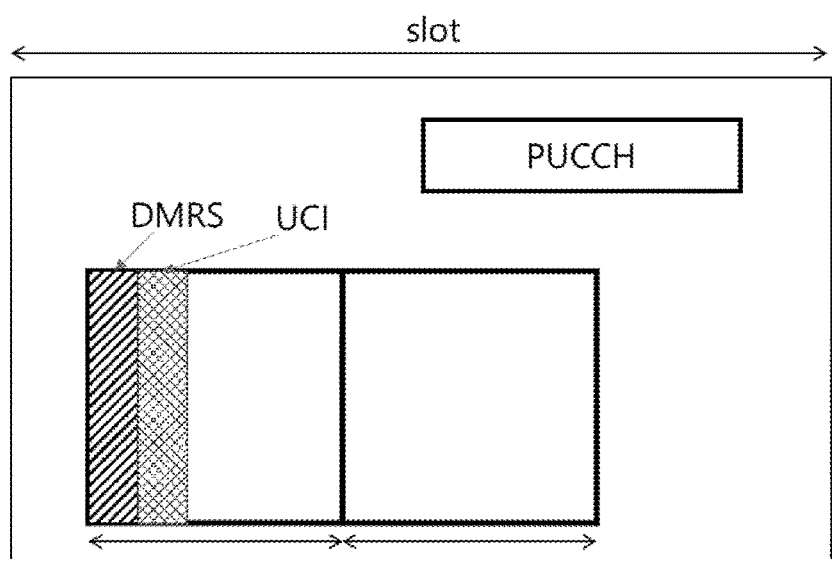
FIG. 27 illustrates the first method of UCI multiplexing for transmission of an adjacent DM-RS-transmitting PUSCH repetition in a configuration in which a PUSCH repetition from which a DM-RS is omitted and another PUCCH are transmitted in the same symbol.
Figure 28:
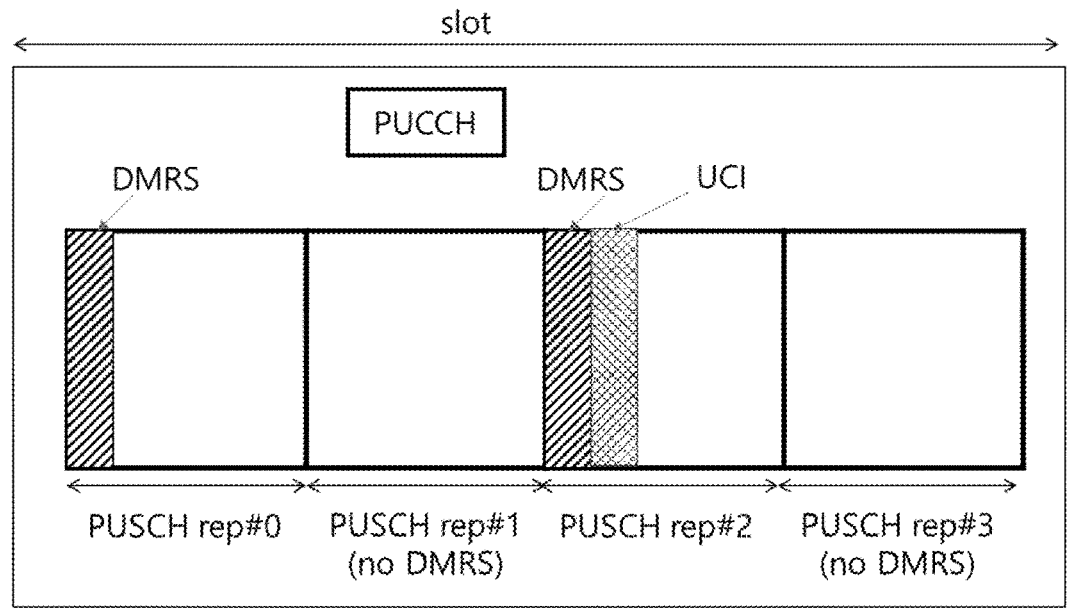
FIG. 28 illustrates the third method of UCI multiplexing for transmission of an adjacent DM-RS-transmitting PUSCH repetition in a configuration in which a PUSCH repetition from which a DM-RS is omitted and another PUCCH are transmitted in the same symbol.

FIG. 27 illustrates UCI multiplexing for an adjacent DM-RS transmission PUSCH repetition in a configuration in which a PUSCH repetition from which a DM-RS is omitted and another PUCCH are transmitted in the same symbol. According to another embodiment, referring to FIG. 27, when the UE is configured and indicated so that a PUSCH repetition from which a DM-RS is omitted and another PUCCH are transmitted in the same symbol, the UE may transmit the UCI by multiplexing (or piggybacking) the UCI on the PUSCH repetition in which the DM-RS is transmitted, among the adjacent PUSCH repetitions. Here, the PUSCH repetition in which the DM-RS is transmitted may be a PUSCH repetition not overlapping the PUCCH in the same symbol. The UE may transmit the UCI by mapping the UCI to a symbol immediately after the DM-RS symbol of the PUSCH repetition in which the DM-RS is transmitted. According to an embodiment of the present disclosure, the PUSCH repetition in which the DM-RS is transmitted, among adjacent PUSCH repetitions, may be determined according to one of the following methods. According to the first method, the PUSCH repetition in which the DM-RS is transmitted corresponds to the closest PUSCH repetition including the DM-RS, among PUSCH repetitions before the overlapping PUSCH repetition from which the DM-RS is omitted. According to the second method, the PUSCH repetition in which the DM-RS is transmitted corresponds to the closest PUSCH repetition including the DM-RS, among PUSCH repetitions after the overlapping PUSCH repetition from which the DM-RS is omitted. According to the third method, the PUSCH repetition in which the DM-RS is transmitted corresponds to a PUSCH repetition including the DM-RS, wherein the PUSCH repetition is closest to the overlapping PUCCH. FIG. 27 shows that the UCI is transmitted in the first PUSCH repetition (PUSCH rep #0) according to the first method. FIG. 28 shows that the UCI is transmitted in the third PUSCH repetition (PUSCH rep #2) according to the third method.

According to another embodiment of the present disclosure, when the UE is configured and indicated so that a PUSCH repetition from which a DM-RS is omitted and another PUCCH are transmitted in the same symbol, the UE may not transmit the PUSCH repetition but drop the same and transmit the PUCCH. However, when the UE is configured and indicated so that a PUSCH repetition including a DM-RS and another PUCCH are transmitted in the same symbol, UCI of the PUCCH may be multiplexed (or piggybacked) on the PUSCH repetition and transmitted.

Figure 29:
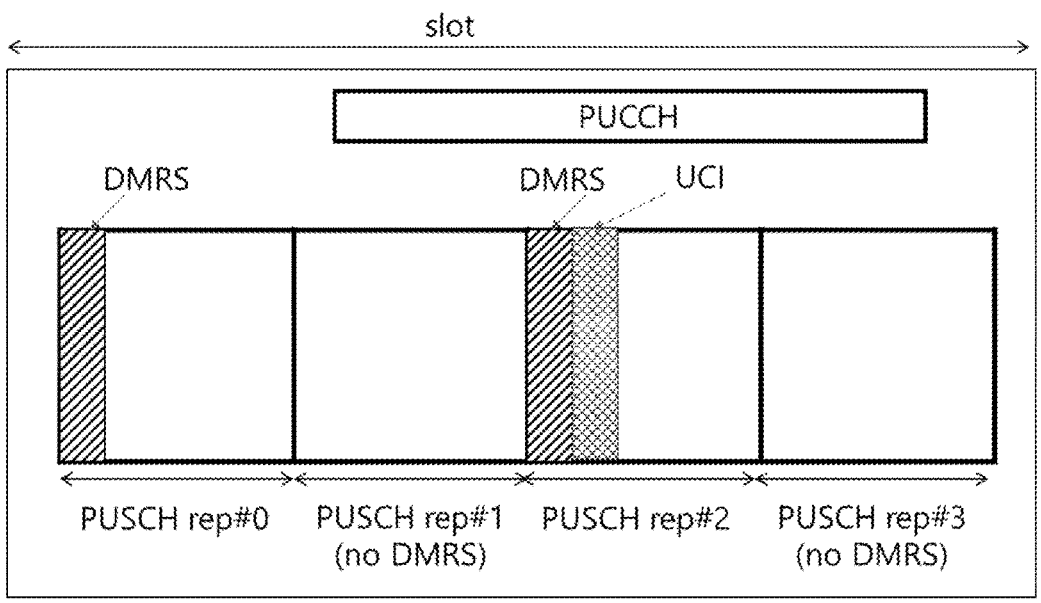
FIG. 29 illustrates omission of UCI multiplexing in a configuration in which a PUSCH repetition from which a DM-RS is omitted and another PUCCH are transmitted in the same symbol.

FIG. 29 illustrates omission of UCI multiplexing in a configuration in which a PUSCH repetition from which a DM-RS is omitted and another PUCCH are transmitted in the same symbol. According to another embodiment of the present disclosure, referring to FIG. 29, in a case in which the UE is configured and indicated so that a PUSCH repetition from which a DM-RS is omitted and another PUCCH are transmitted in the same symbol, when UCI included in the PUCCH is transmitted in at least one PUSCH repetition, the UE may not multiplex or piggyback the UCI on the PUSCH repetition from which the DM-RS is omitted and may not transmit the same. FIG. 29 shows that the UE is configured and indicated so that the second PUSCH repetition (PUSCH rep #1), the third PUSCH repetition (PUSCH rep #2), the fourth PUSCH repetition (PUSCH rep #3), and the PUCCH are transmitted in the same symbol. Here, the DM-RS is omitted from each of the second PUSCH repetition and the fourth PUSCH repetition, and the DM-RS is included in each of the first PUSCH repetition and the third PUSCH repetition. Since the DM-RS exists in the third PUSCH, the UCI is multiplexed (or piggybacked) on the corresponding PUSCH repetition and transmitted. Accordingly, the UCI may not be multiplexed (or piggybacked) on the second PUSCH repetition and the fourth PUSCH repetition, from which the DM-RSs are omitted.

Another illustrative problem to be solved by the present disclosure relates to a method for performing UCI multiplexing (or piggybacking) in a situation in which multiple PUSCH repetitions overlap one PUCCH in symbols. For example, when four 2-symbol PUSCH repetitions (the first PUSCH repetition, the second PUSCH repetition, the third PUSCH repetition, and the fourth repetition) overlap one PUCCH, the UE should piggyback UCI on the four PUSCH repetitions. In this case, the same UCI is repetitively transmitted in the four PUSCH repetitions, and thus there may be a problem of an increase in the number of resources to be used for UCI transmission, and there may be also a problem of a lack of resources to be used for uplink data (that is, UL-SCH) for the UCI transmission, whereby uplink data transmission may fail. In the present disclosure, a method for solving the problems is suggested.

According to an embodiment of the present disclosure, when multiple PUSCH repetitions overlap one PUCCH, the UE may transmit UCI by multiplexing (or piggybacking) the UCI on only one PUSCH repetition, and may not transmit the UCI in the remaining PUSCH repetitions. The one PUSCH repetition may be the first PUSCH repetition which is the most preceding among the PUSCH repetitions. According to another method, the one PUSCH repetition may be the most preceding PUSCH repetition among the PUSCH repetitions overlapping the PUCCH. According to another method, the one PUSCH repetition may be the last PUSCH repetition among the PUSCH repetitions. According to another method, the one PUSCH repetition may be the last PUSCH repetition among the PUSCH repetitions overlapping the PUCCH. According to another method, the one PUSCH repetition may be the most preceding PUSCH repetition among the PUSCH repetitions satisfying the PUCCH processing time. According to another method, the one PUSCH repetition may be the most preceding PUSCH repetition among the PUSCH repetitions in the slot in which the PUCCH is transmitted. According to another method, the one PUSCH repetition may be the last PUSCH repetition among the PUSCH repetitions in the slot in which the PUCCH is transmitted. According to another method, the one PUSCH repetition may be the last PUSCH repetition among the PUSCH repetitions overlapping the PUCCH. According to another method, the one PUSCH repetition may be the most preceding PUSCH repetition among the PUSCH repetitions satisfying the PUCCH processing time in the slot in which the PUCCH is transmitted. In the selection process, the PUSCH repetition having no DM-RS may be excluded.

According to an embodiment of the present disclosure, when UCI is multiplexed (or piggybacked) on multiple PUSCH repetitions and transmitted, the UE does not transmit all the UCI in each PUSCH repetition, but may divide the UCI into parts to transmit the same in respective PUSCH repetitions. For example, when the UCI is given by N-bit, and the UCI is multiplexed (or piggybacked) on two PUSCH repetitions and transmitted, the UE may transmit one half of the N-bit UCI (N/2 bits, ceil(N/2) bits, or floor(N/2) bits) in one PUSCH repetition, and may transmit the other half (N/2 bits, or floor(N/2) bits, or ceil(N/2) bits) in the other PUSCH repetition. In general, when UCI is multiplexed (or piggybacked) on K PUSCH repetitions and transmitted, ceil(N/K) bits of UCI may be transmitted in K1 (K1=mod(N,K)) PUSCH repetitions, or floor(N/K) bits of UCI may be transmitted in K2 (K2=K−K1) PUSCH repetitions. In this case, different types of UCI may be separately divided. That is, the UCI is segmented into HARQ-ACK information, CSI part 1, and CSI part 2, and the segmented HARQ-ACK information, CSI part 1, and CSI part 2 may be mapped to respective PUSCH repetitions and transmitted.

Figure 30:
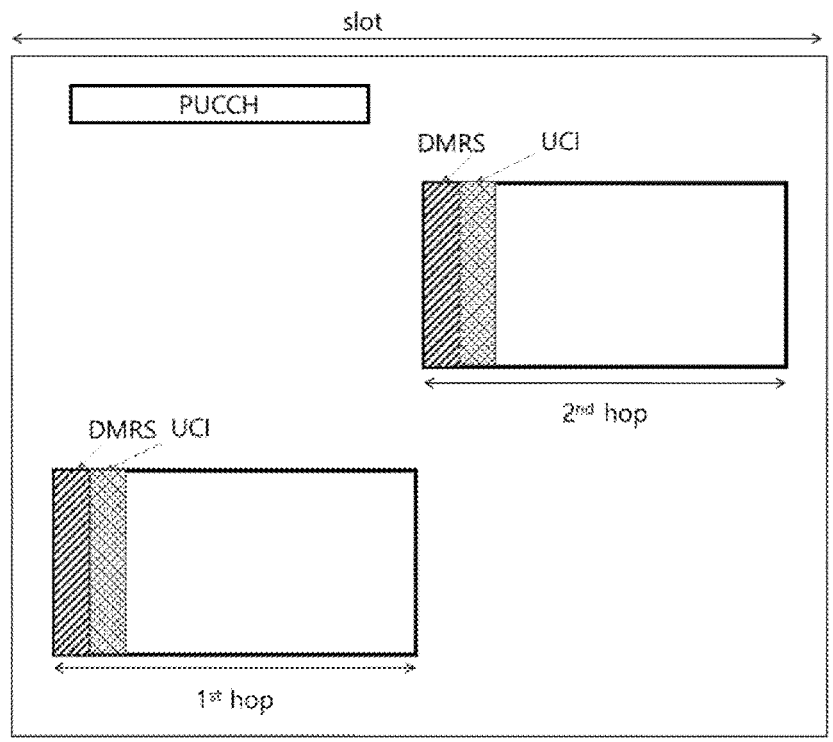
FIG. 30 illustrates UCI transmission in a case in which a PUSCH having an intra-slot hopping configuration overlaps in at least one symbol.

Another illustrative problem to be solved by the present disclosure relates to a method for transmitting UCI included in a PUCCH when a PUSCH having an intra-slot hopping configuration overlaps the PUCCH in a symbol. Referring to the standard document 3GPP T38.213, the UCI may be divided into two PUSCH hops (the first hop and the second hop) in which intra-slot hopping is configured, and may be multiplexed (or piggybacked) on the hops and transmitted. FIG. 30 illustrates UCI transmission in a case in which a PUSCH having an intra-slot hopping configuration overlaps in at least one symbol. For example, referring to FIG. 30, when a PUCCH overlaps a PUSCH in at least one symbol, UCI may be transmitted in two hops. By transmitting the UCI in two hops, the UCI may acquire a frequency diversity gain, and thus the probability of successful reception may increase. However, referring to FIG. 30, compared to a case in which only the PUCCH is solely transmitted, when the UCI is transmitted in two hops, all the UCI may be received once the UCI to be transmitted in the second hop is received. Accordingly, a delay may occur in receiving the UCI. In the present disclosure, a method for solving the problem is suggested.

According to an embodiment of the present disclosure, the UE may multiplex (or piggyback) UCI on only a PUSCH hop overlapping a PUCCH. That is, referring to FIG. 30, when the PUCCH overlaps the first hop but does not overlap the second hop, all the UCI is multiplexed (or piggybacked) on the first hop and transmitted. According to another embodiment, the UE may multiplex (or piggyback) the UCI on the PUSCH hop overlapping the PUCCH and the previous hops. That is, when the PUCCH overlaps the first hop but does not overlap the second hop, all the UCI is multiplexed (or piggybacked) on the first hop and transmitted, and when the PUCCH does not overlap the first hop, the UCI is divided into two parts and the two UCI parts are multiplexed (or piggybacked) on the first hope and the second hop, respectively, and transmitted.

Although the method and system of the present disclosure have been described in connection with specific embodiments, some or all of their components or operations may be implemented using a computing system having a general-purpose hardware architecture.

The above description of the present disclosure is for illustrative purposes only, and those of ordinary skill in the art to which the present disclosure pertains will be able to understand that other specific forms can be easily modified without changing the technical spirit or essential features of the present disclosure. Therefore, it should be understood that the embodiments described above are illustrative and non-limiting in all respects. For example, each component described as a single type may be implemented in a distributed manner, and similarly, components described as being distributed may also be implemented in a combined form.

The scope of the present disclosure is indicated by the claims to be described later rather than the detailed description, and all changes or modified forms derived from the meaning and scope of the claims and their equivalent concepts should be construed as being included in the scope of the present disclosure.

The invention claimed is:
1. A method for transmitting a physical uplink shared channel (PUSCH) repetition by a user equipment (UE) in a wireless communication system, the method comprising:
    receiving a radio resource control (RRC) signal comprising configuration information,
    wherein the configuration information includes information for symbols of a slot, and each of the symbols is configured as one of an uplink symbol, a flexible symbol, and a downlink symbol;
    receiving a physical downlink control channel (PDCCH) for scheduling at least one PUSCH repetition on a symbol set;
    determining one or more invalid symbols for the at least one PUSCH repetition among the symbol set; and transmitting the at least one PUSCH repetition on one or more valid symbols, wherein the one or more valid symbols are remaining symbols of the symbol set after said determination, wherein the one or more invalid symbols include a symbol indicated as a downlink symbol by the configuration information.

2. The method of claim 1, wherein a number of the at least one PUSCH repetition is configured to be two or more.

3. The method of claim 1, wherein each of the at least one PUSCH repetition is transmitted on a fastest valid symbol of a corresponding subset among the symbol set.

4. The method of claim 1, wherein the one or more invalid symbols include a specific number of symbols after a last symbol indicated as a downlink symbol by the configuration information among the symbol set.

5. The method of claim 1, wherein the one or more invalid symbols include one or more symbols for a synchronization signal (SS)/physical broadcast channel (PBCH) block.

6. The method of claim 1, wherein when (i) a first PUSCH repetition of the at least one PUSCH repetition overlaps with a PUSCH scheduled by a downlink control information (DCI), and (ii) the PUSCH has the same HARQ process number (HPN) as the first PUSCH repetition, a transmission of the first PUSCH repetition is terminated.

7. The method of claim 1, wherein the PDCCH indicates a value from 0 to 13 as a start symbol position (S) of the at least one PUSCH repetition, and indicates a value from 1 to 14 as a length (L) of the at least one PUSCH repetition, and a sum of the S and the L has a value from 1 to 27.

8. A user equipment (UE) configured to transmit a physical uplink shared channel (PUSCH) repetition in a wireless communication system, the UE comprising:

a communication module; and a processor functionally connected to the communication module, wherein the processor is configured to:

receive a radio resource control (RRC) signal comprising configuration information, wherein the configuration information includes information for symbols of a slot, and each of the symbols is configured as one of an uplink symbol, a flexible symbol, and a downlink symbol, receive a physical downlink control channel (PDCCH) for scheduling at least one PUSCH repetition on a symbol set, determine one or more invalid symbols for the at least one PUSCH repetition among the symbol set, transmit the at least one PUSCH repetition on one or more valid symbols, wherein the one or more valid symbols are remaining symbols of the symbol set after said determination, wherein the one or more invalid symbols include a symbol indicated as a downlink symbol by the configuration information.

9. The UE of claim 8, wherein a number of the at least one PUSCH repetition is configured to be two or more.

10. The UE of claim 8, wherein each of the at least one PUSCH repetition is transmitted on a fastest valid symbol of a corresponding subset among the symbol set.

11. The UE of claim 8, wherein the one or more invalid symbols include a specific number of symbols after a last symbol indicated as a downlink symbol by the configuration information among the symbol set.

12. The UE of claim 8, wherein the one or more invalid symbols include one or more symbols for a synchronization signal (SS)/physical broadcast channel (PBCH) block.

13. The UE of claim 8, when (i) a first PUSCH repetition of the at least one PUSCH repetition overlaps with a PUSCH scheduled by a downlink control information (DCI), and (ii) the PUSCH has the same HARQ process number (HPN) as the first PUSCH repetition, a transmission of the first PUSCH repetition is terminated.

14. The UE of claim 8, wherein the PDCCH indicates a value from 0 to 13 as a start symbol position (S) of the at least one PUSCH repetition, and indicates a value from 1 to 14 as a length (L) of the at least one a PUSCH repetition, and a sum of the S and the L has a value from 1 to 27.

15. A base station configured to receive a physical uplink shared channel (PUSCH) repetition in a wireless communication system, the base station comprising:

a communication module; and a processor functionally connected to the communication module, wherein the processor is configured to:

transmit a radio resource control (RRC) signal comprising configuration information, wherein the configuration information includes information for symbols of a slot, and each of the symbols is configured as one of an uplink symbol, a flexible symbol, and a downlink symbol, transmit a physical downlink control channel (PDCCH) for scheduling at least one PUSCH repetition on a symbol set, transmit information for one or more invalid symbols for the at least one PUSCH repetition among the symbol set, receive the at least one PUSCH repetition on one or more valid symbols, wherein the one or more valid symbols are remaining symbols of the symbol set after excluding the one or more invalid symbols, wherein the one or more invalid symbols include a symbol indicated as a downlink symbol by the configuration information.

* * * * *